(12) United States Patent
Lee et al.

(10) Patent No.: US 10,791,258 B2
(45) Date of Patent: Sep. 29, 2020

(54) MONITORING APPARATUS AND SYSTEM

(71) Applicant: Hanwha Techwin Co., Ltd., Seongnam-si (KR)

(72) Inventors: Ho Jung Lee, Seongnam-si (KR); Yeon Woo Kim, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 29 days.

(21) Appl. No.: 16/214,912

(22) Filed: Dec. 10, 2018

(65) Prior Publication Data
US 2019/0116305 A1    Apr. 18, 2019

Related U.S. Application Data

(63) Continuation of application No. PCT/KR2016/007044, filed on Jun. 30, 2016.

(30) Foreign Application Priority Data

Jun. 28, 2016 (KR) .................. 10-2016-0080675

(51) Int. Cl.
*G08B 29/02*    (2006.01)
*H04N 5/232*    (2006.01)
(Continued)

(52) U.S. Cl.
CPC ....... *H04N 5/23203* (2013.01); *G06F 3/0485* (2013.01); *G06F 3/04845* (2013.01);
(Continued)

(58) Field of Classification Search
None
See application file for complete search history.

(56) References Cited

U.S. PATENT DOCUMENTS

2012/0092447 A1*  4/2012  Jeong ............... H04L 51/08
                                                            348/36
2012/0194336 A1*  8/2012  Thiruvengada .. G08B 13/19645
                                                            340/525
(Continued)

FOREIGN PATENT DOCUMENTS

KR    10-2012-0035455 A    4/2012
KR    10-2012-0105201 A    9/2012
WO       2010/137860 A2   12/2010

OTHER PUBLICATIONS

Search Report dated Apr. 11, 2017, issued by the International Searching Authority in International Application No. PCT/KR2016/007044 (PCT/ISA/210).
(Continued)

*Primary Examiner* — Eileen M Adams
(74) *Attorney, Agent, or Firm* — Sughrue Mion, PLLC

(57) ABSTRACT

A monitoring device includes: a communication interface configured to receive image data acquired by a camera and a signal generated by at least one sensor; a screen configured to display thereon the received image data as a main image; and a controller configured to control operations of the communication interface and the screen, wherein the controller controls the screen to include a control area around an area for displaying the main image so that the control area displays the main image and a surrounding image of the main image, and wherein, in response to the sensor sensing at least one event, the controller controls generation of an alarm with indication of at least one pointer associated with the sensor in the control area as a source of the sensing the event, and controls the main image to be changed to cover an area where the sensor is disposed.

20 Claims, 19 Drawing Sheets

(51) Int. Cl.
*H04N 5/357* (2011.01)
*G08B 13/196* (2006.01)
*H04N 5/77* (2006.01)
*H04N 7/18* (2006.01)
*G06F 3/0485* (2013.01)
*G06F 3/0484* (2013.01)

(52) U.S. Cl.
CPC ............ *G08B 13/196* (2013.01); *G08B 29/02* (2013.01); *H04N 5/23206* (2013.01); *H04N 5/23216* (2013.01); *H04N 5/23238* (2013.01); *H04N 5/23296* (2013.01); *H04N 5/23299* (2018.08); *H04N 5/232933* (2018.08); *H04N 5/3572* (2013.01); *H04N 5/77* (2013.01); *H04N 7/18* (2013.01); *H04N 7/183* (2013.01); *G06F 2203/04806* (2013.01)

(56) References Cited

U.S. PATENT DOCUMENTS

| | | | |
|---|---|---|---|
| 2015/0213697 A1* | 7/2015 | Knox | G08B 17/10 382/103 |
| 2016/0011654 A1* | 1/2016 | Lee | G06N 3/063 345/156 |
| 2016/0086462 A1 | 3/2016 | Meganathan et al. | |
| 2016/0173827 A1 | 6/2016 | Dannan et al. | |

OTHER PUBLICATIONS

Written Opinion dated Apr. 11, 2017, issued by the International Searching Authority in International Application No. PCT/KR2016/007044 (PCT/ISA/237).

* cited by examiner

MONITORING APPARATUS AND SYSTEM

CROSS-REFERENCE TO THE RELATED APPLICATION

This application is a continuation of International Application No. PCT/KR2016/007044, filed Jun. 30, 2016 which claims priority from Korean Patent Application No. 10-2016-0080675, filed on Jun. 28, 2016, in the Korean Intellectual Property Office, the disclosures of which are incorporated herein in their entirety by reference.

BACKGROUND

1. Field

The present disclosure relates to a monitoring device and system, and more particularly, to a monitoring device and system that can easily pan and/or tilt a camera or an image by a simple operation to move another image and can intuitionally determine whether an event occurs and the situation of the event in cooperation with sensors for sensing the event.

2. Description of the Related Art

Surveillance systems are widely used in various places including banks, department stores, residential areas. Such surveillance systems can be used mainly for crime prevention and security purposes, and recently can also be used indoors for monitoring pets or children in real-time. As one of such surveillance systems, the closed circuit television (CCTV) system is most commonly used, in which cameras are installed appropriate locations for monitoring desired areas so that a user can monitor by watching images captured by the cameras.

Typical front cameras have a limited angle of view, and thus, it sometimes fails to track an object to be monitored if it moves out of the angle of view. Therefore, the features of panning, tilting and/or zooming (PTZ) a camera or an image captured by a camera are necessary. In recent years, there has been an increasing interest in the development of user interface (UI)/user experience (UX) for user convenience that allows users to easily perform such panning, tilting, and zooming features. Cameras recently have increased the range of panning and/or tilting. In particular, many cameras have been developed that can capture images of a very wide angle of view, such as a fisheye camera or a 360° camera.

Previously, when an event occurs in the vicinity of a camera, the user has to monitor the image by her/himself to find the event and the situation of the event. Therefore, the user cannot intuitively find the event even if the event occurs.

A technique has been recently introduced that allows an alarm to sound in a monitoring device capable of monitoring an image acquired by a camera if an event occurs. Although the technique allows the user to determine that an event has occurred, the user cannot determine the location of the event and the situation in detail.

Incidentally, in order to move the image captured by a camera, a user had to operate direction keys to pan and/or tilt the camera up-and-down direction and left-to-right direction. It takes too long time to use the direction keys to pan and/or tilt the camera across a wide range of angles.

SUMMARY

Exemplary embodiments of the inventive concept provide a monitoring device and system that can easily pan or tilt a camera or an image by a simple operation to move an image and intuitionally determine whether an event occurs and the situation of the event in cooperation with sensors for sensing the event.

It should be noted that objects of the exemplary embodiments are not limited to the above-mentioned object; and other objects of the embodiments will be apparent to those skilled in the art from the following descriptions.

According to an exemplary embodiment, there is provided a monitoring device which may include: a communication interface configured to receive image data acquired by a camera and a signal generated by at least one sensor; a screen configured to display thereon the received image data as a main image; and a controller configured to control operations of the communication interface and the screen, wherein the controller controls the screen to include a control area around an area for displaying the main image so that the control area displays the main image and a surrounding image of the main image, and wherein, in response to the sensor sensing at least one event, the controller controls generation of an alarm with indication of at least one pointer associated with the sensor in the control area as a source of the sensing the event, and controls the main image to be changed to cover an area where the sensor is disposed.

According to an exemplary embodiment, there is provided a monitoring system which may include the above-described camera, sensor and monitoring device.

According to an exemplary embodiment, there is provided a monitoring device which may include: a communication interface configured to receive image data acquired by a camera and a signal generated by at least one sensor or a user; a screen configured to display thereon the received image data as a main image; and a controller configured to control operations of the communication interface and the screen, wherein the controller controls the screen to include a control area around an area for displaying the main image so that the control area displays the main image and a surrounding image of the main image, and wherein, in response to the sensor sensing at least one event, the controller controls the screen to indicate at least one pointer associated with the sensor in the control area as a source of the sensing the event, and controls the main image to be changed to cover an area where the sensor is disposed.

According to an exemplary embodiment, there is provide a monitoring method which may include: receiving image data acquired by a camera and a signal generated by at least one sensor or a user; displaying on a screen the received image data as a main image; and controlling the screen to include a control area around an area for displaying the main image so that the control area displays the main image and a surrounding image of the main image, and wherein, in response to the sensor sensing at least one event, controlling the screen to indicate at least one pointer associated with the sensor in the control area as a source of the sensing the event, and controls the main image to be changed to cover an area where the sensor is disposed.

In response to a user selecting the pointer, associated with the sensor sensing the event, in the control area, the controller may control the screen to display the main image focusing the sensor associated with the pointer by panning and/or tilting the camera.

In response to a user selecting the pointer, associated with the sensor sensing the event, in the control area, the controller may control the screen to display the main image focusing the sensor associated with the pointer by panning and/or tilting the main image without panning and/or tilting the camera.

The surrounding area displayed in the control area may include a panoramic image covering the main image.

It should be noted that effects of the inventive concept are not limited to those described above and below, and other effects of the inventive concept will be apparent to those skilled in the art from the following descriptions.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EXEMPLARY EMBODIMENTS

Figure 1:
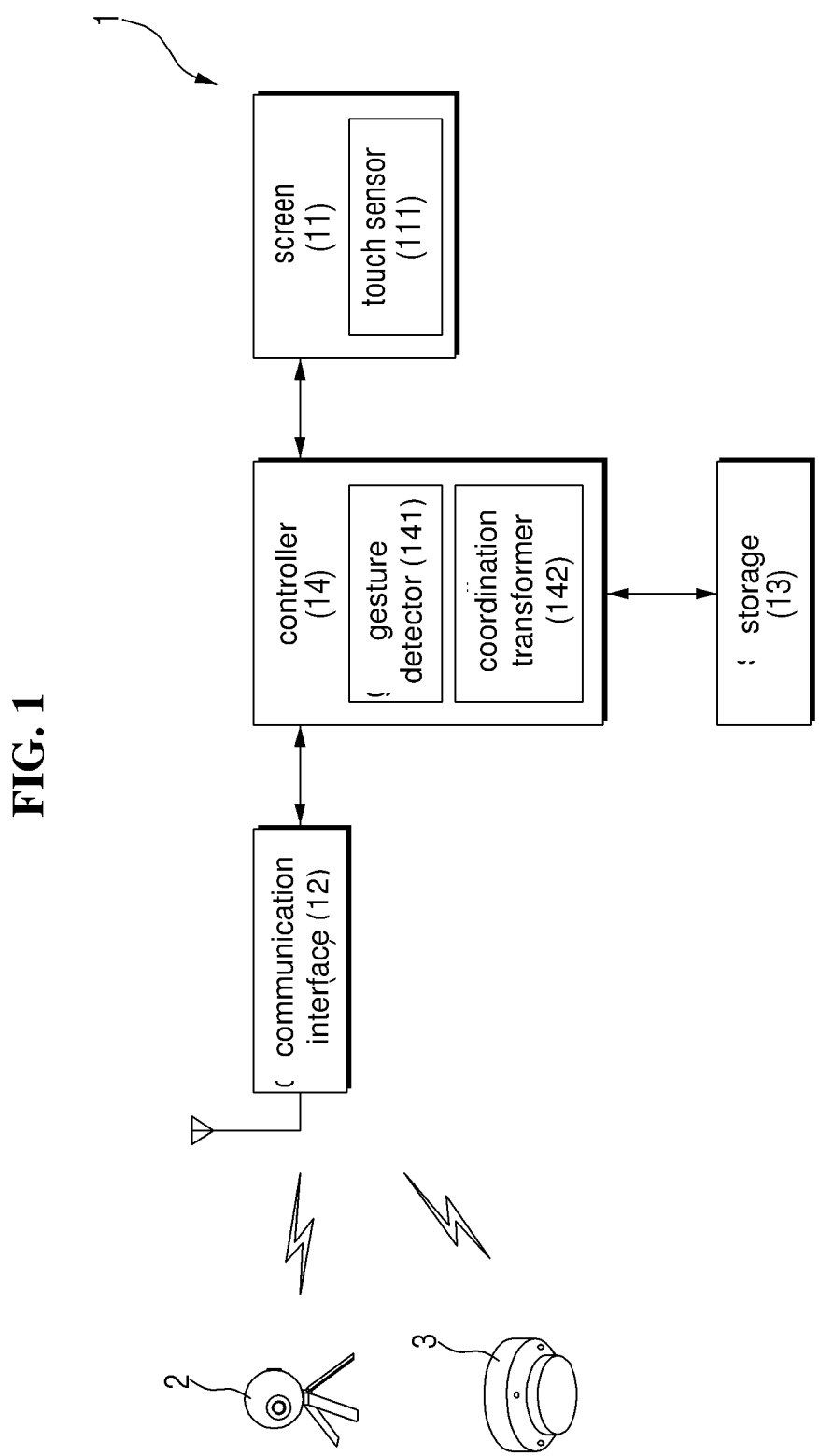
FIG. 1 is a block diagram of a monitoring system according to an exemplary embodiment.

Advantages and features of the inventive concept and methods to achieve them will become apparent from the descriptions of exemplary embodiments hereinbelow with reference to the accompanying drawings. It is understood that all embodiments described herebelow are exemplary. However, the inventive concept is not limited to the exemplary embodiments disclosed herein but may be implemented in various different ways. These exemplary embodiments are provided for making the disclosure of the inventive concept thorough and for fully conveying the scope of the inventive concept to those skilled in the art. It is to be noted that the scope of the inventive concept is defined only by the claims Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the exemplary embodiments rather than limiting the inventive concept. Unless specifically mentioned otherwise, a singular form may also include a plural form in the exemplary embodiments. Throughout this specification, the word "comprise" and variations such as "comprises" or "comprising," will be understood to imply the inclusion of stated elements but not the exclusion of any other elements. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, when an exemplary embodiment can be implemented differently, functions or operations described in a particular block may occur in a different way from a flow described in the flowchart. For example, two consecutive blocks may be performed simultaneously, or the blocks may be performed in reverse according to related functions or operations.

An exemplary embodiment provided in the following description is not excluded from being associated with one or more features of another example or another exemplary embodiment also provided herein or not provided herein but consistent with the inventive concept. For example, even if matters described in a specific example are not described in a different example thereto, the matters may be understood as being related to or combined with the different example, unless otherwise mentioned in descriptions thereof.

Hereinafter, exemplary embodiments of the inventive concept will be described in detail with reference to the accompanying drawings.

Figure 2:
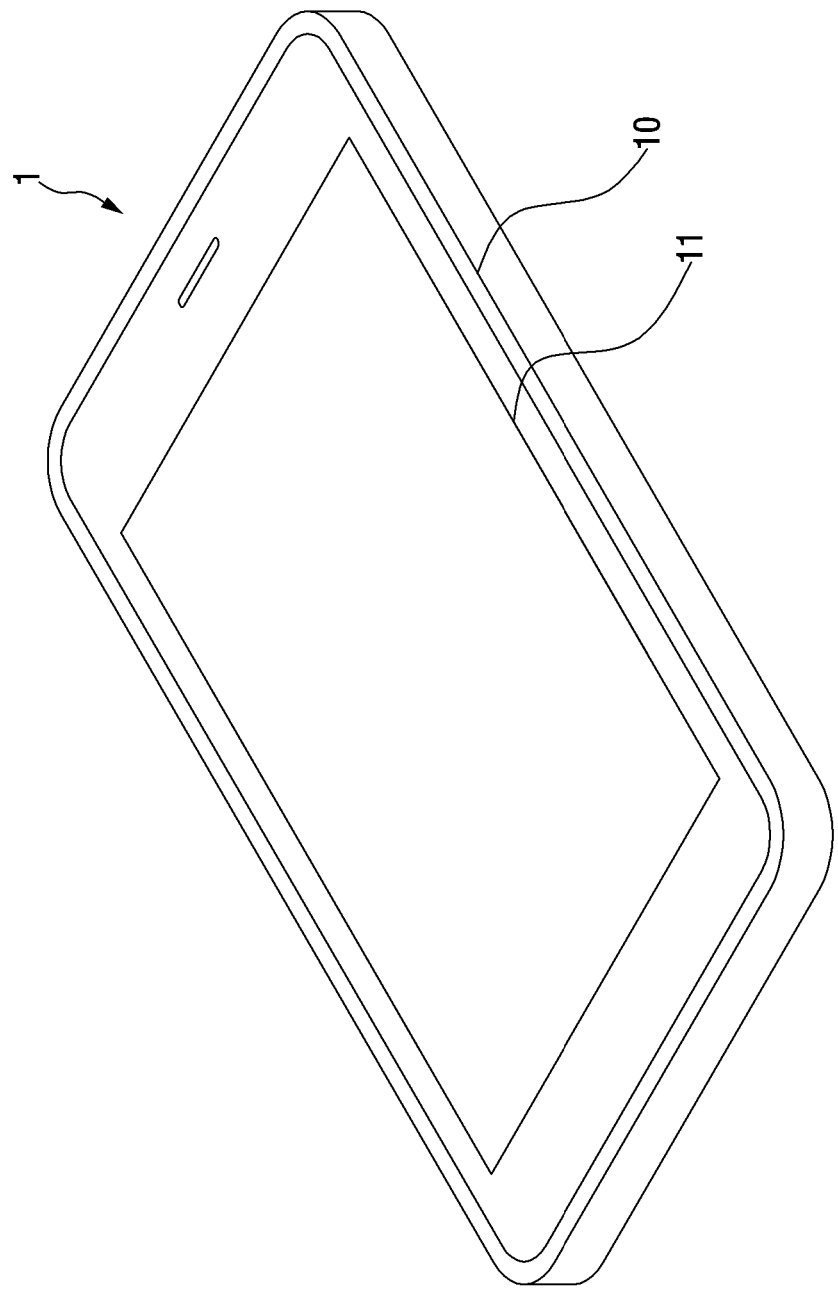
FIG. 2 is a perspective view of a monitoring device according to an exemplary embodiment.

FIG. 1 is a block diagram of a monitoring system according to an exemplary embodiment. FIG. 2 is a perspective view of the monitoring device 1 of FIG. 1, according to an exemplary embodiment.

In a method of using the monitoring system according to an embodiment, a control area 113 is displayed on a screen 11 of a monitoring device 1. A user may pan or tilt a main image 112 displayed on the screen 11 through the control area 113. A pointer 116 corresponding to and associated with a sensor 3 is displayed in the control area 113. When the sensor 3 senses an event, it may send an event sense signal, and the monitoring device 1 may receive the event sense signal, and sound an alarm with indication of the pointer 116 associated with the sensor 3 as a source of the event sense signal in the control area 113. When the alarm sounds with indication of the pointer 116 displayed in the control area 113, the user can determine that the event has occurred, and can also monitor the event easily.

According to an exemplary embodiment, a monitoring system includes a camera 2 for capturing a specific region to acquire an image, a sensor 3 for transmitting a signal when an event is sensed, and a monitoring device 1 for receiving the image acquired by the camera 2 to display it and for receiving the signal transmitted from the sensor 3. The camera 2 and the sensor 3 may be connected to the monitoring device 1 via wired or wireless connection for transmission and reception of image data and/or signals.

The camera 2 according to the exemplary embodiment is preferably, but not necessarily, a pan/tilt camera capable of panning and tilting. More preferably, but not necessarily, the camera 2 may be a camera that can pan through 360° so that it can capture omnidirectional images, i.e., the front, rear, left and right. Alternatively, the camera 2 may be a 360° camera recently introduced. The 360° camera refers to a camera that does not physically pan and/or tilt itself but includes a plurality of fisheye lenses so that it can simultaneously capture omnidirectional images. In this case, the image acquired by the 360° camera is panned and/or tilted through the software installed in the monitoring device 1. It is to be understood that the camera 2 according to the exemplary embodiment is not limited to this, and any of a variety of cameras may be used as long as it can capture several regions.

The sensor 3 according to the exemplary embodiment may sense an event. For example, the sensor 3 may include a fire detection sensor for detecting a fire breakout, a smoke detection sensor for detecting a smoke, a heat detection or infrared detection sensor for detecting appearance of a person or an animal. It is to be understood that the sensor 3 is not limited thereto. A variety of kinds of sensors may be employed as long as they can sense certain kinds of event.

The monitoring device 1 according to the exemplary embodiment receives an image acquired by the camera 2 to display it. Then, the monitoring device 1 receives a signal transmitted from the sensor 3 to sound an alarm. The monitoring device 1 may be a device with a touch screen feature such as a smartphone, a tablet PC and a laptop. It is, however, to be understood that the present disclosure is not limited thereto. The monitoring device 1 may be a device that receives a user command through a mouse or the like. In the following description, the monitoring device 1 will be described as a device with a touch screen feature. It is to be noted that this is merely illustrative for convenience of illustration and is not intended to limit the scope.

The user may install and delete various applications on and from the monitoring device 1. Among them, the user may run a camera control application, to generate a signal for controlling panning and/or tilting of an image by using input means such as a touch screen and a mouse. If an image can be captured, and thus, moved or changed (hereinafter collectively referred to as "moved") by panning and/or tilting the camera 2 itself, the control signal is transmitted to the camera 2. On the other hand, when the camera 2 is a 360° camera, the control signal moves an image by panning and/or tilting the image through the software installed in the monitoring device 1.

As shown in FIGS. 1 and 2, the monitoring device 1 may include a main body 10, a screen 11 for displaying an image thereon, a communication interface 12 for receiving an image from the camera 2, a storage 13 for storing the image, and a controller 14 for controlling elements of the monitoring device 1 including the screen 11 and the storage 13.

The screen 11 displays a main image 112 transmitted from the camera 2. As described above, the screen 11 may display the control area 113 on one side of the main image 112. When the sensor 3 senses an event, a pointer 116 is displayed in the control area 113. The pointer 116 is associated with the sensor 3, and is indicated in the control area 113 as the source of an event sense signal along with an alarm sounding.

If the monitoring device 1 has no touch screen feature, an input unit is provided separately. Typically, a mouse, a keyboard, a joystick and a remote controller are commonly used as the input unit. If the monitoring device 1 provides a touch screen feature, the screen 11 may include a touch sensor 111. Then, the user can directly input a touch signal through the screen 11. The touch sensor 111 may be mounted integrally with the screen 11. The touch sensor 111 senses touches made on the screen 11 to detect coordinates of the points where the touches are made, the number of touches and the intensity of the touches, and transmits the detected results to the controller 14. Various methods such as an electrostatic capacity type, an electric resistance film type, an ultrasonic type, a proximity input type, and an infrared type may be used depending on the way how the touch sensor 111 senses a touch. The touch may be performed using a finger. It is, however, to be understood that the present disclosure is not limited thereto. A touch may be made by using a stylus pen equipped with a tip through which a minute current can flow, etc. A separate touch pad may be provided as an input unit if the screen 11 does not include the touch sensor 111 even if the monitoring device 1 provides a touch screen feature.

The communication interface 12 communicates with the camera 2 and the sensor 3 via wired or wireless connection. For example, the communication interface 12 modulates signals and data received from the controller 14 and up-converts their frequencies to transmit them, or down-converts the frequencies of signals and data received from the camera 2 and the sensor 3 and demodulates to provide them to the controller 14. In this manner, the communication interface 12 may receive image data from the camera 2 or receive a signal from the sensor 3, and may also transmit data or a signal generated from the controller 14 to the camera 2 or the sensor 3.

The storage 13 stores therein programs for processing and controlling operations of the monitoring device 1, a variety of kinds of data generated during the execution of each of the programs, image data transmitted through the camera 2, and signals received through the sensor 3, etc. The storage 13 may be embedded in the monitoring device 1. In the case of a network camera system, however, a separate device may be provided, such as a network video recorder (NVR).

The controller 14 controls the overall operation of the monitoring device 1. For example, the controller 14 performs processing and control for signal and data communications between the communication interfaces 12 and the camera 2 and/or the sensor 3. When an image is transmitted through the communication interface 12, image processing such as decoding and rendering is performed. When the user's command is input, the controller 14 processes it to control the screen 11 such that it displays the control area 113 or sounds an alarm with indication of the pointer 116 in the control area 113 as the source of an event sense signal. In addition, the controller 14 stores images in the storage 13, and loads the stored image therefrom. As the controller 14, a central processing unit (CPU), a microcontroller unit (MCU), or a digital signal processor (DSP) may be employed. It is, however, to be understood that the present disclosure is not limited thereto, but a variety of logic operation processors may be employed as well.

The controller 14 includes a gesture detector 141 and a coordinate transformer 142. The gesture detector 141 detects a touch gesture from the touch sensor 111. The touch gesture includes all the touch operations generated from the touch sensor 111. If the monitoring device 1 does not support a touch screen feature, a user command input through an input unit such as a mouse is detected. The gesture detector 141 manages the touch sensor 111 and includes an application program interface (API) that allows a user to easily use a touch gesture in an application. An API refers to an interface that controls the functions provided by an operating system or programming language for use in an application. The gesture detector 141 receives a user command for executing the camera control application through the API and receives a user command for controlling the activated application.

The coordinate transformer 142 receives the coordinates of a point where the user command is input from the gesture detector 141, and generates a panning and/or tilting value for an image based on the coordinates. If the user touches one point on the screen in order to drag an image, coordinates for the point are extracted. When the user drags the image, the coordinates on the dragging path are extracted at regular periods or intervals. The coordinate transformer 142 may determine the direction in which the image is dragged and the distance based on the extracted coordinates and may convert them into a value to be used for panning and/or tilting. By panning and/or tilting the image using the above value and displaying it on the screen 11, the image can be panned and/or tilted as the user has dragged it.

If the camera 2 is a 360° camera, the camera 2 uses a fish-eye lens, and thus, there may be distortion in an acquire image. For this reason, the controller 14 may further include a distortion corrector (not shown). While such a fisheye lens provides images across a wide angle of view, distortion becomes larger due to refraction toward the edge of the image away from the optical axis.

As a result, a subject near the center of lens of the camera 2 looks extremely large whereas surrounding subjects look very small.

Sometimes such a distorted image as it is may be used. However, it is often necessary to correct a distorted image in some applications. Such correction of a distorted image obtained by the fisheye lens is generally referred to as "distortion correction" or "dewarping." The dewarping is carried out with an appropriate mathematical formula using appropriate parameters such as the focal distance or the optical center position of the fisheye lens depending on the way of projection used in the fisheye lens.

Such original image may be transmitted to the monitoring device 1, and then, corrected via software in the distortion corrector in the above-described manner. However, in recent years, a technique has been introduced to dispose a chip for correcting a distortion in the original image inside the camera 2. If the camera 2 can dewarp the original image by itself, it is not necessary to install software for the dewarping in the monitoring device 1 that receives images from the camera 2. Therefore, when a single camera transmits an image to a plurality of monitoring devices, dewarping is possible without installing software in all the monitoring devices, so that the corrected image can be displayed immediately.

Figure 3:
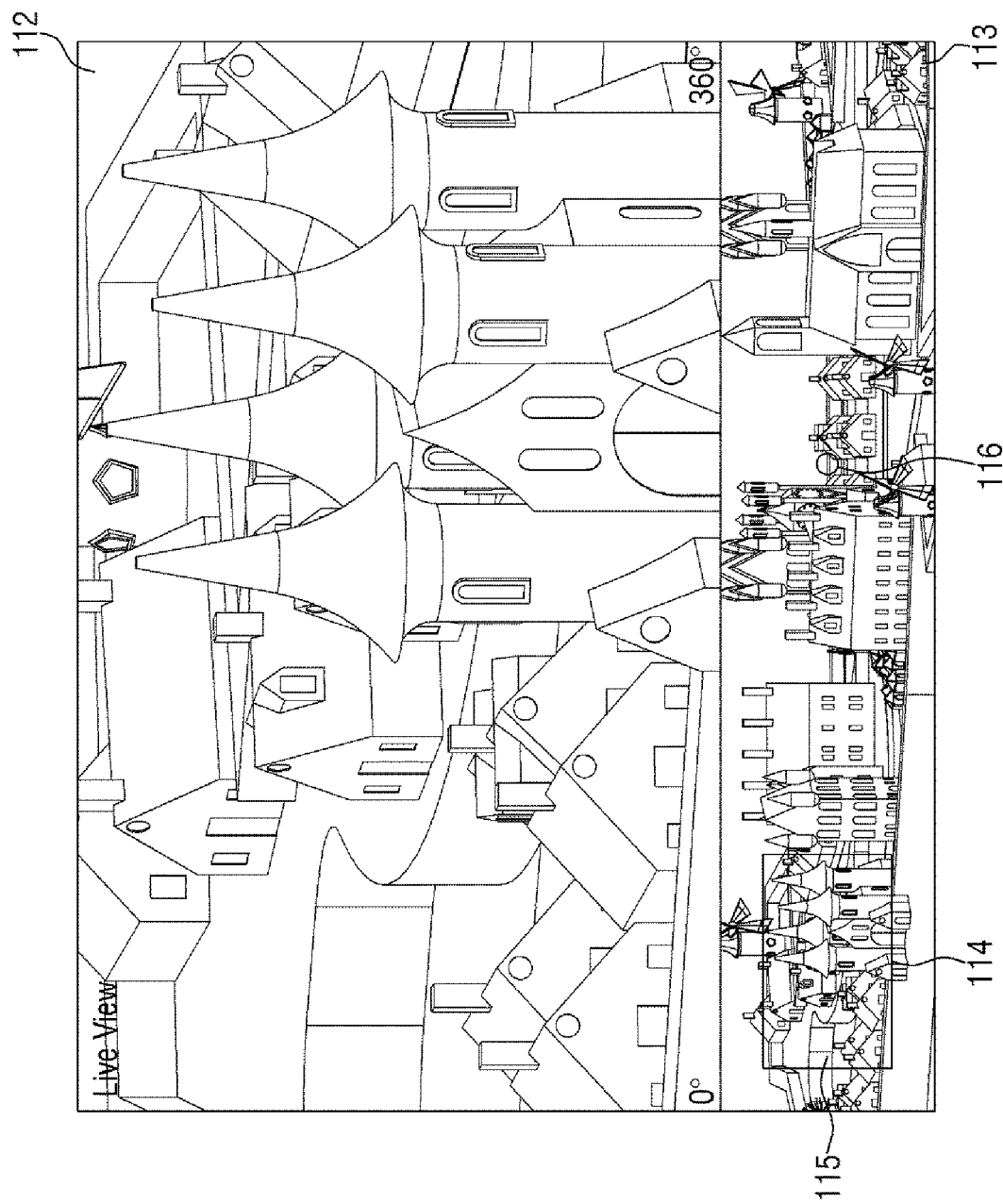
FIG. 3 is a view showing a control area in a screen of a monitoring device, according to an exemplary embodiment.
Figure 4:
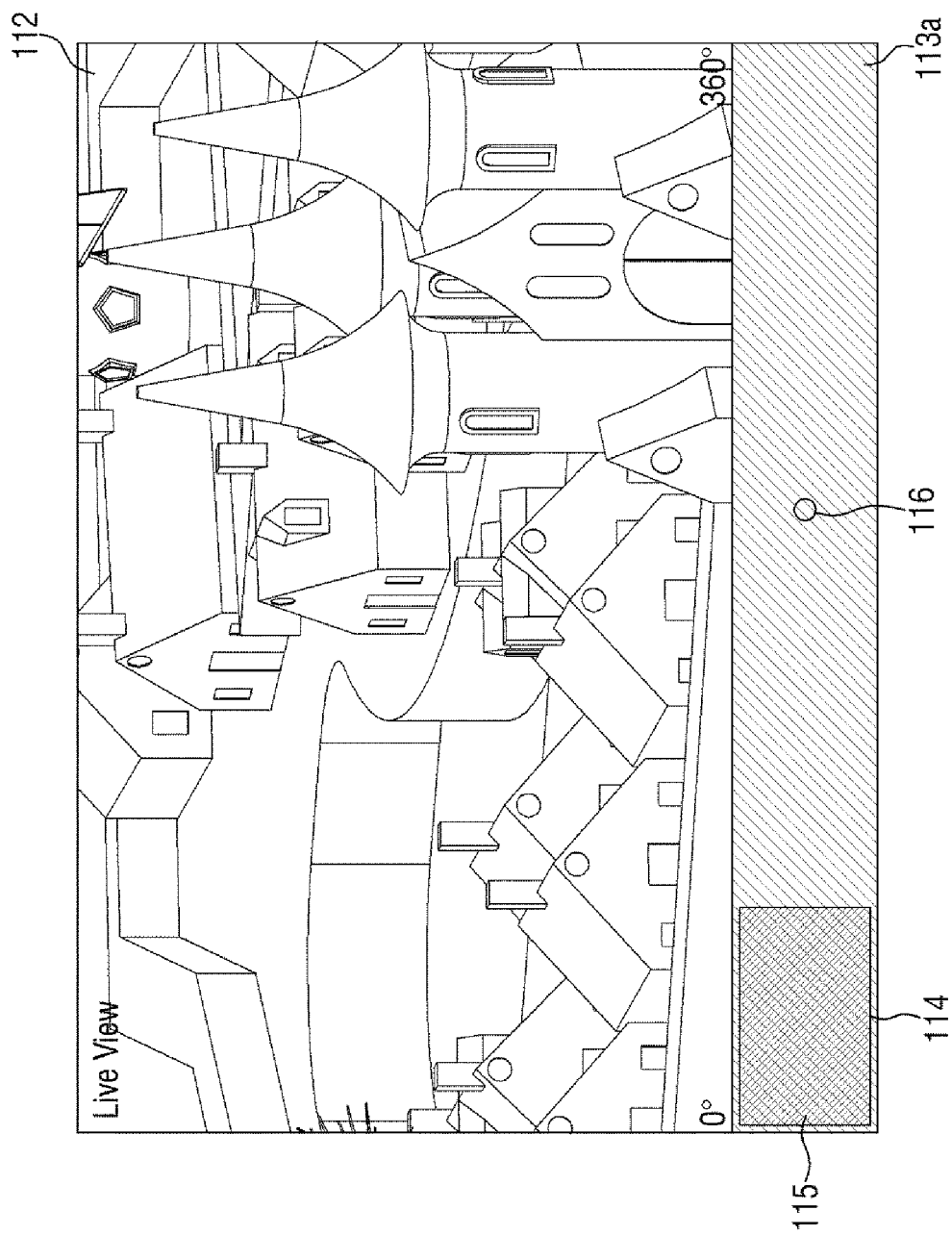
FIG. 4 is a view showing a control area 113 in a screen of a monitoring device, according to another exemplary embodiment.

FIG. 3 is a view showing the control area 113 according to an exemplary embodiment displayed on the screen 11 of the monitoring device 1. FIG. 4 is a view showing the control area 113 according to another exemplary embodiment displayed on the screen 11 of the monitoring device 1.

When the monitoring device 1 according to the exemplary embodiment is operated, the main image 112 is displayed on the screen 11, and at the same time, the control area 113 is displayed. It is preferable, but not necessary, that the main image 112 is a live view which is an image captured by the camera 2 in real time. It is, however, to be understood that the present disclosure is not limited thereto. The main image 112 may be a playback image which is already taken in the past and stored in the storage 13, and then loaded and displayed. It is preferable, but not necessary, that the control area 113 is displayed on one side of the screen 11. In particular, as shown in FIGS. 3 and 4, it is more preferable, but not necessary, that the control area 113 is displayed on the lower side of the screen 11. It is, however, to be understood that the present disclosure is not limited thereto. The control area 113 may be displayed at different positions in the screen 11.

The control area 113 corresponds to the area of an image that can be captured by the camera 2 by panning and/or tilting it. If the camera 2 is a pan/tilt camera, the control area 113 corresponds to the area that the camera 2 can pan and/or tilt. If the camera 2 is 360° camera or a pan/tilt camera capable of panning through 360°, the control area 113 can cover omnidirectional areas around the camera 2. On both ends of the control area 113, it is preferable, but not necessary, that the minimum and maximum panning angles are displayed, as shown in FIGS. 3 and 4.

In the control area 113, a window 114 indicating a region 115 corresponding to the main image 112 is displayed. The window 114 is formed in the shape of a single closed curve that surrounds the region 115 of the main image 112. The shape of the window 114 may be the same as that of the main image 112, and it is preferable, but not necessary, that the window 114 has a rectangular shape, as shown in FIGS. 3 and 4.

According to an exemplary embodiment, the control area 113 is a panoramic view that shows, as an image, an entire range that can be captured by the camera 2, as shown in FIG. 3. A panoramic view is an image obtained by taking images along a direction longer than a normal image, in order to capture many scenes in a single image. If the camera 2 is a 360° camera, the angle of view is very wide, so that it is possible to capture a panoramic view in real time. Therefore, the panoramic view may be another live view that is different from the live view of the main image 112 displayed on the screen 11. Accordingly, the user can monitor the entire angle of view in real time through the panorama live view as well as a specific angle of view through the live view of the main image 112.

If the camera 2 is a pan/tilt camera, it is not easy to take a panoramic view in real time. Therefore, the panoramic view can be obtained by synthesizing a plurality of images obtained by panning and/or tilting the camera 2. The panoramic view thus obtained is a still picture, not a live view. In this case, the user can monitor in real time only from the live view of the main image 112. The panoramic view as the still picture may also be used to allow the user to easily determine a region where the user wants to move the image.

If the camera 2 does not support a panoramic view capturing feature, a control area 113*a* according to another exemplary embodiment may be presented in the form of scroll bar that covers all directions that the camera 2 can be directed to, as shown in FIG. 4. Also in this case, when the user monitors the main image 112 and enters a command into the control area 113*a*, it is possible to easily pan and/or tilt the image.

Although the camera 2 is shown as being capable of both panning and tilting in FIG. 3, only one of panning and tilting may be possible depending on the capability of the camera 2. In addition, although the camera 2 is shown as being capable of panning only in FIG. 4, both panning and tilting may be possible depending on the capability of the camera 2. That is, the control area 113 according to this exemplary embodiment may be changed into different forms depending on whether the camera 2 supports the panning and/or tilting features.

Although not shown in the drawings, the user may scale the displayed main image 112 by zooming it in or out, for example. When a user performs a pinch-out gesture on the main image 112 using two fingers, the displayed image is zoomed in. When the user performs a pinch-in gesture, the displayed image is zoomed out. The pinch-in and pinch-out gestures refer to one of the touch gestures, which area performed by sliding two fingers in the opposite directions on the screen 11. Typically, the pinch-in and pinch-out gestures are used to scale the image displayed on the screen 11. If the two fingers slide toward each other, the gesture is referred to as a pinch-in or pinch close gesture. As a result, the image is preferably, but not necessary, becomes smaller. If the two fingers slide away from each other, the gesture is referred to as a pinch-out or pinch open gesture. As a result, the image is preferably, but not necessary, becomes larger.

Alternatively, if the user taps the main image 112 on the screen, the main image 112 may be zoomed in. When the user taps twice (a double-tap gesture), the main image 112 may be zoomed out. At this time, it is preferable, but not necessary, that the main image 112 is zoomed in or zoomed out with respect to the point where the user performed the tap gesture or the double-tap gesture.

Alternatively, if the user performs a double-tap gesture on the main image 112 on the screen 11, the main image 112 may be zoomed in or out. Specifically, if the user performs the double-tap gesture on a zoomed-in image, then the image is zoomed out, and vice versa. In this manner, scaling has only two values, i.e., the predetermined zoom-in scale and zoom-out scale.

When the user enters a command to the monitoring device 1 by using a mouse, she/he puts a mouse cursor over the main image 112 by using the mouse (mouse over) and scrolls up or down the mouse wheel to thereby zoom-in or out the main image 112. Alternatively, there may be several menus including a zoom-out menu and a zoom-in menu, so that the user may zoom-in or out the main image 112 by clicking the menu by using the mouse.

Figure 5:
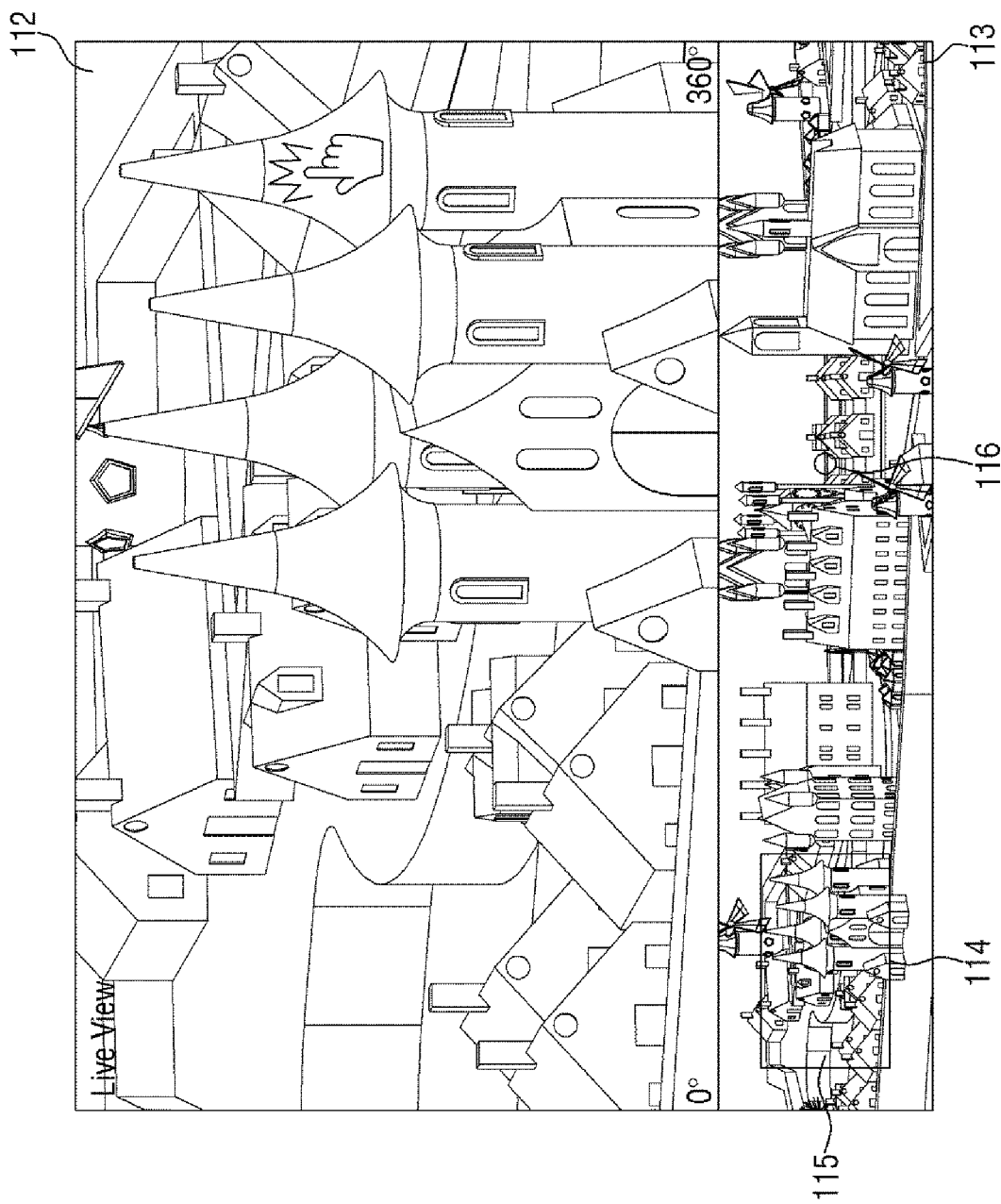
FIG. 5 is a view for illustrating a dragging gesture on a main image in a screen of a monitoring device, according to an exemplary embodiment.
Figure 6:
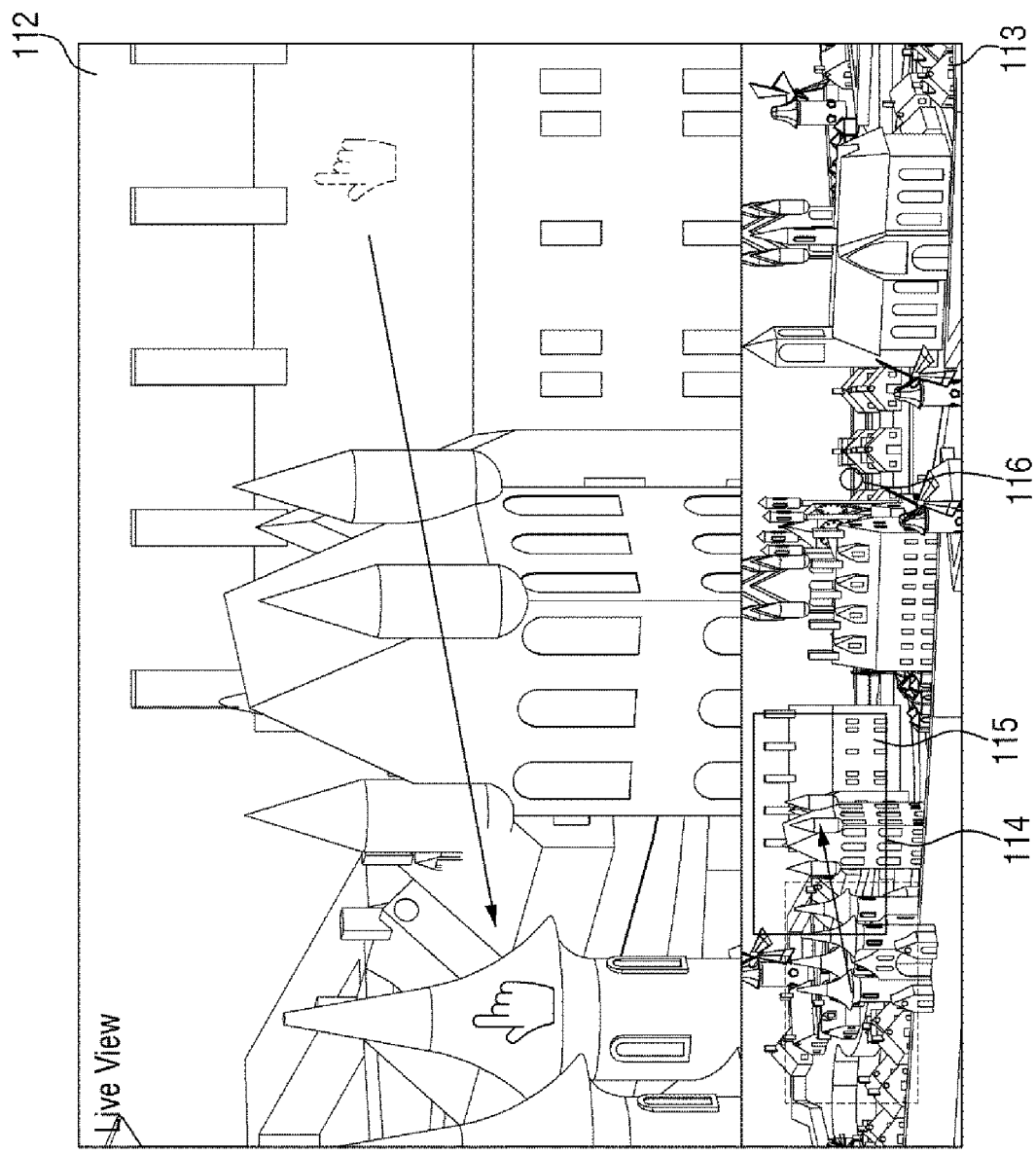
FIG. 6 is a view showing a main image in a screen of a monitoring device moved by panning a camera by performing a dragging gesture, according to an exemplary embodiment.

FIG. 5 is a view for illustrating a dragging gesture on the main image 112 according to an exemplary embodiment. FIG. 6 is a view showing the main image 112 moved by panning the camera 2 or panning the main image 112 that may be captured by a 360° camera by performing the dragging gesture in FIG. 5.

A drag gesture is one of the touch gestures and refers to dragging an object for touch gesture on the screen from one point to another point to move the object.

On the screen 11 of the monitoring device 1, the main image 112 such as a live view or a playback is displayed. In order to perform a drag gesture, the user touches the main image 112 as shown in FIG. 5. Then, the main image 112 is dragged from one point to another point. As a result, the main image 112 shown in FIG. 6 is displayed which is obtained by panning and/or tilting the camera 2 or panning and/or tiling the main image 112. In doing so, in order to drag the main image 112, the user should keep touching the screen. At the same time, the window 114 indicating the region 115 corresponding to the main image 112 in the control area 113 also moves as shown in FIG. 6. That is, when the main image 112 is moved by panning and/or tilting, the window 114 is moved within the control area 113 to indicate the corresponding region 115 of the main image 112.

Once the main image 112 has been moved by panning and/or tilting to display a desired region, the user may release the touch. If it is not possible to pan and/or tilt the camera 2 to reach a desired position by dragging once, the above process is repeated. When the user enters a command to the monitoring device 1 by using the mouse, the main image 112 can be panned and/or tilted by dragging the main image 112 with the mouse.

Figure 7:
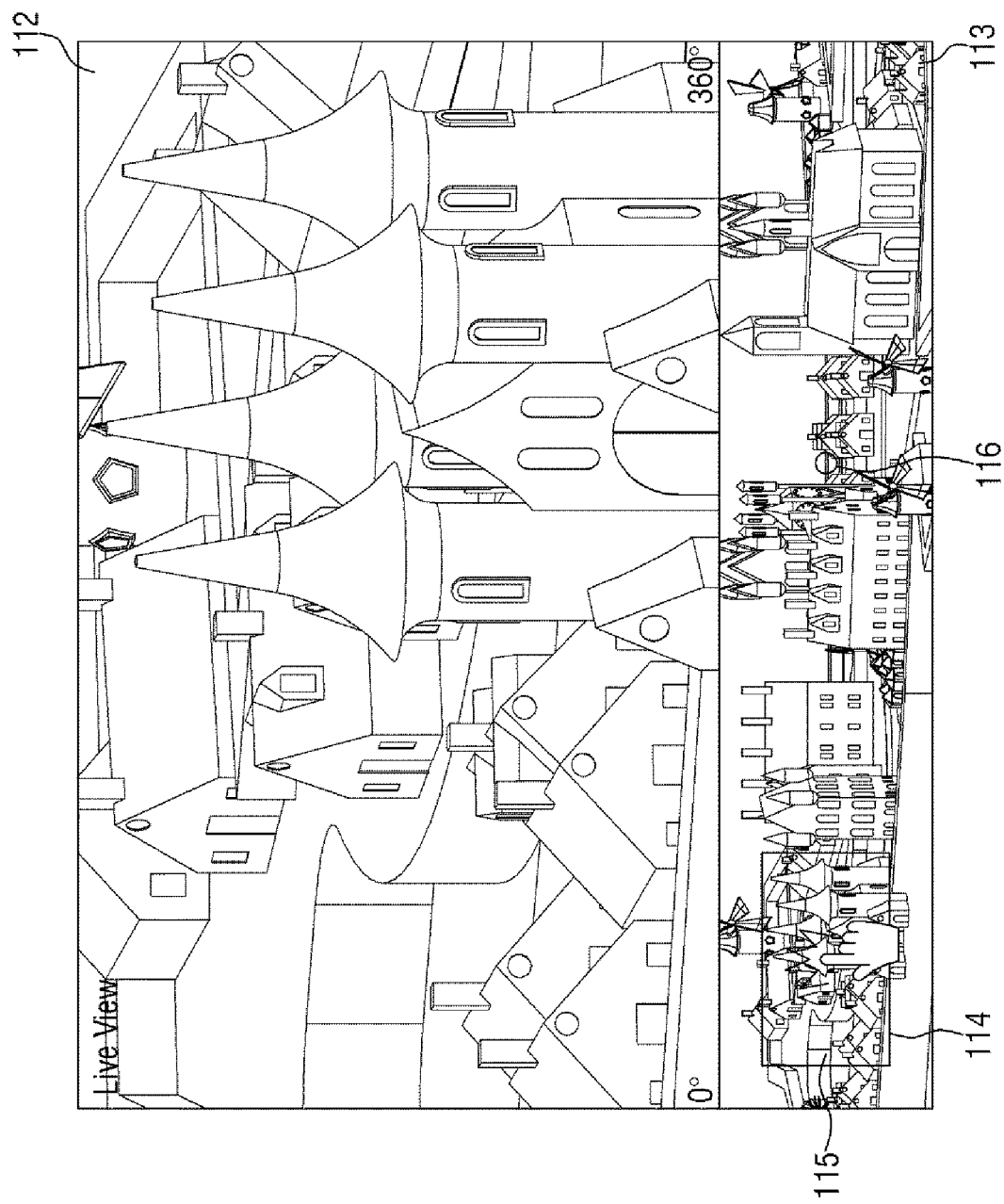
FIG. 7 is a view for illustrating a dragging gesture on a window in a control area of a screen of a monitoring device, according to an exemplary embodiment.
Figure 8:
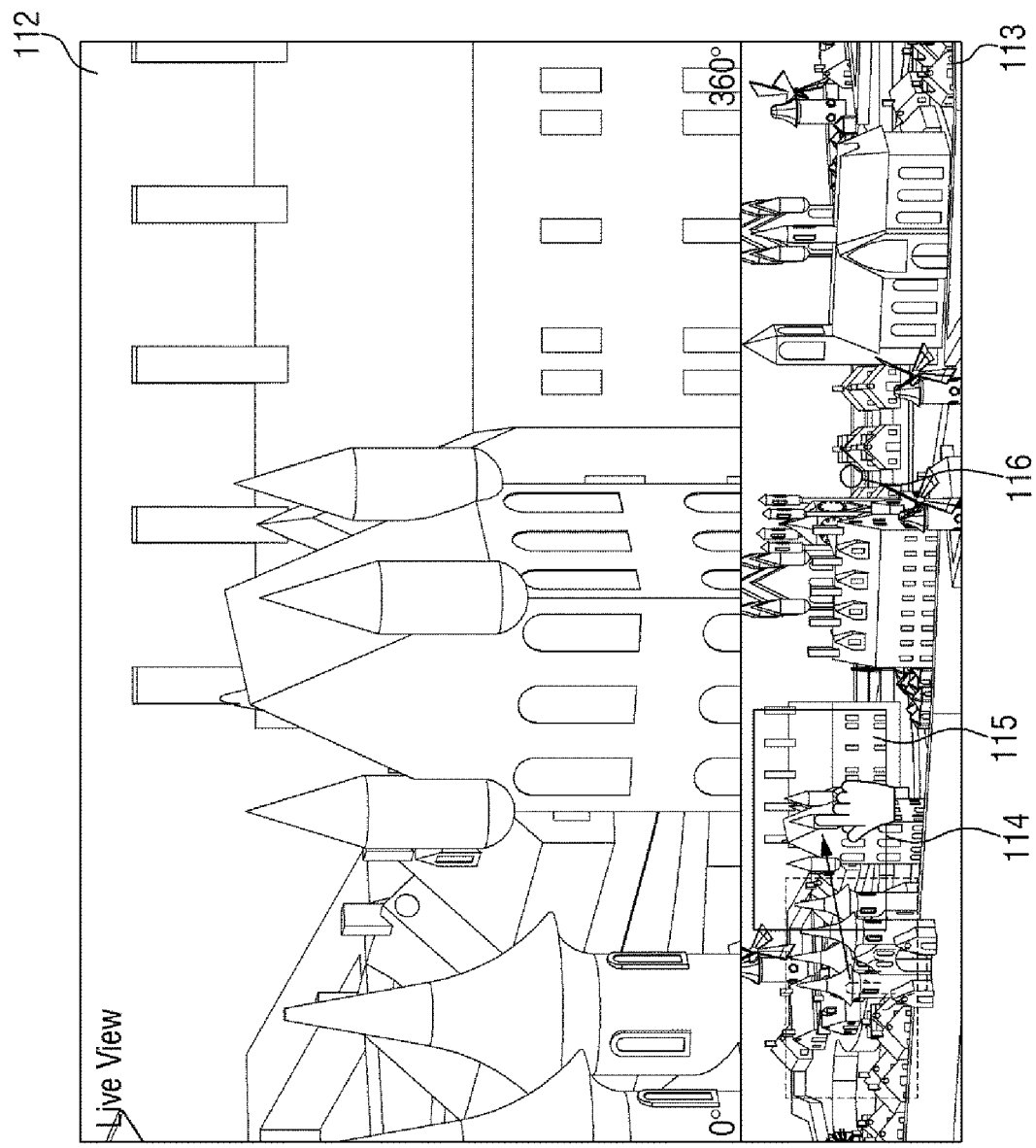
FIG. 8 is a view showing a main image in a screen of a monitoring device moved by panning a camera by performing a dragging gesture, according to an exemplary embodiment.

FIG. 7 is a view for illustrating a dragging gesture on the window 114 according to an exemplary embodiment. FIG. 8 is a view showing the main image 112 moved by panning the camera 2 or panning the main image 112 by performing the dragging gesture in FIG. 7.

The user may move the window 114 to move the main image 112 by or without panning and/or tilting the camera 2. The user touches the region 115 in the window 114 to drag it as shown in FIG. 7. Then, the region 115 in the window 114 is dragged from one point to another point. As a result, the window 114 is moved in the control area 113 as shown in FIG. 8. In order to drag the region 115 within the window 114, the user should keep touching the screen. At the same time, the main image 112 is also moved by panning and/or tilting as shown in FIG. 8. That is, when the window 114 is moved in the control area 113, the main image 112 shows an image corresponding to the region 115 in the moved window 114 as the camera 2 pans and/or tilts, or the main image 112 is panned and/or tilted without the camera 2 being panned and/or tilted.

Once the main image 112 has been moved by panning and/or tilting to display a desired region as above, the user may release the touch. If it is not possible to reach a desired position by dragging once to control the panning and/or tilting, the above process is repeated. When the user enters a command to the monitoring device 1 by using the mouse, the main image 112 can be moved by or without panning and/or tilting the camera 2 by dragging the region 115 in the window 114.

Further, although not shown in the drawings, the user may tap a point in the control area 113 to move the main image 112 by or without panning and/or tilting the camera 2. The tap gesture is one of the touch gestures and refers to touching the screen 11 and immediately releasing the touching.

Figure 9:
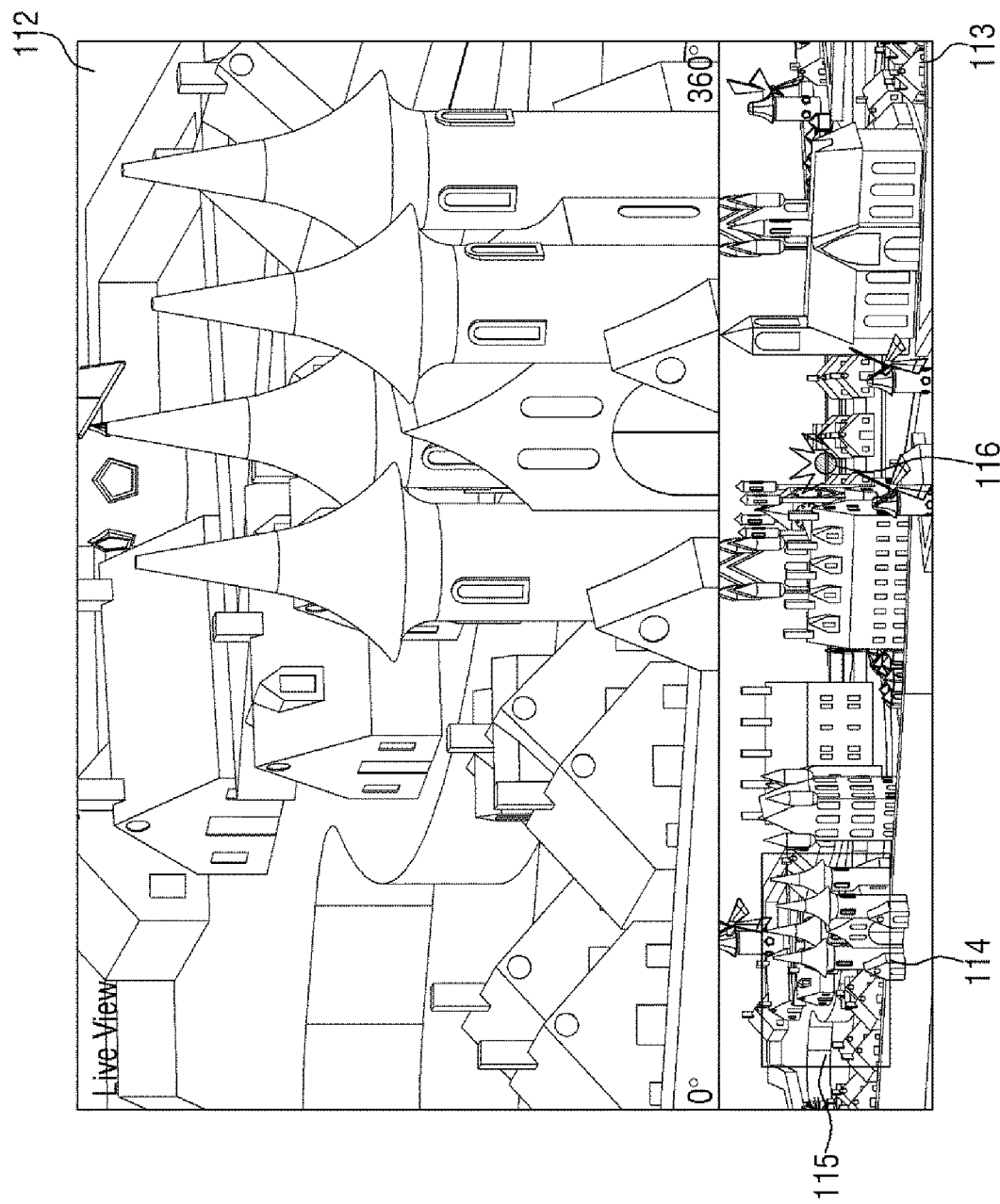
FIG. 9 is a view for showing an alarm sound with indication of a pointer, according to an exemplary embodiment.

FIG. 9 is a view for showing an alarm sound with indication of a pointer 116 according to an exemplary embodiment.

A sensor 3 may be installed around the camera 2. In the control area 113 of the monitoring device 1, the pointer 116 is displayed at a point corresponding to a position where the sensor 3 is installed. It is preferable, but not necessary, that the sensor 3 is equipped with a global positioning system (GPS) so that the monitoring device 1 can determine the position of the sensor 3 immediately.

As described above, when the sensor 3 senses an event, it generates an event sense signal to transmit it to the monitoring device 1. When the communication interface 12 of the monitoring device 1 receives the event sense signal, an alarm sounds with indication of the pointer 116 associated with the sensor 3 in the control area 113 as the source of the event sense signal, as shown in FIG. 9. The alarm may sound with indication of light of a particular color, e.g., red light, on the pointer 116, or may sound with indication of light flickering repeatedly at a regular period. The alarm may include an alarm sound in addition to an alarm light at an indicator of the monitoring device, or may cause the monitoring device 1 to vibrate. That is, a variety of kinds of alarms may be used as long as it can notify the user an event The pointer 116 may be always displayed irrespective of whether or not an event occurs, or may be hidden normally and displayed with an alarm sound when an event occurs. The pointer 116 may have a transparent circle shape as shown in FIG. 9. It is, however, to be understood that the present disclosure is not limited thereto. The pointer 116 may have a variety of shapes and colors as long as it allows the user to easily determine the location of the sensor 3 and whether or not an event occurs.

Figure 10:
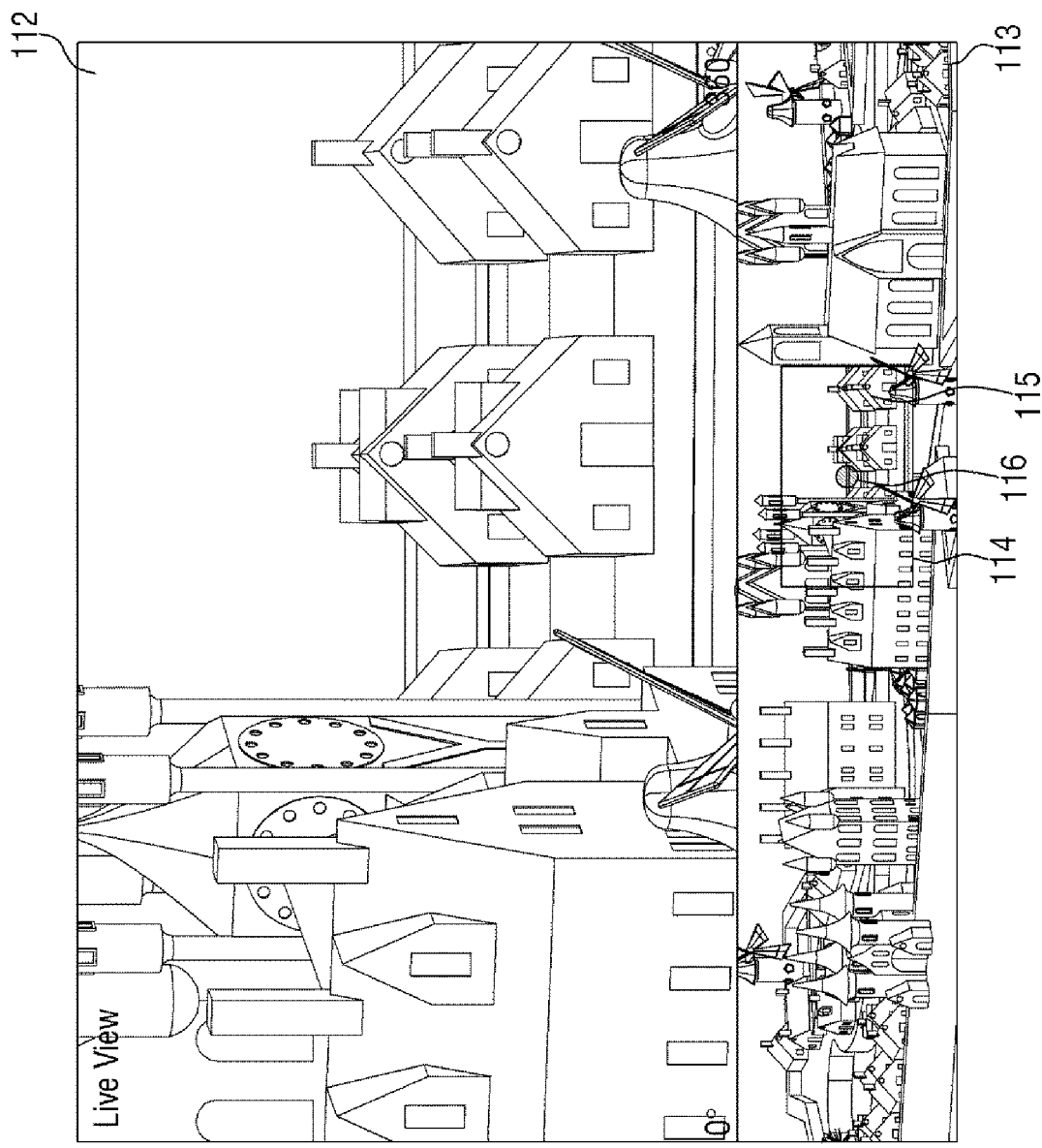
FIG. 10 is a view showing an image focusing a sensor associated with a pointer in a control area of a screen of a monitoring device, according to an exemplary embodiment.

FIG. 10 is a view showing an image focusing the sensor 3 associated with the pointer 116 of FIG. 9.

As described above, when the sensor 3 senses an event, the monitoring device 1 generates an alarm with respect to the pointer 116. At the same time, the camera 2 or the main image 112 may automatically pan and/or tilt to capture the sensor 3 having sensed the event so that the main image 112 focusing the sensor 3 is displayed, as shown in FIG. 10.

If the camera 2 is a pan/tilt camera, the camera 2 itself may pan and/or tilt, and accordingly the images captured while the camera 2 pans or tilts are displayed on the screen 11. If the camera 2 is a 360° camera, on the other hand, the camera 2 has already acquired omnidirectional images. In addition, panning and/or tilting is performed by the software installed in the monitoring device 1. Accordingly, the images captured while the camera 2 pans and/or tilts are not displayed on the screen 11, and instead, the image focusing the sensor 3 may be directly displayed on the screen 11.

When the alarm sounds with respect to the pointer 116 displayed in the control area 113, the user can be easily notified that an event has occurred. Further, as the camera 2 automatically pans and/or tilts so that the main image 112 focuses the sensor 3 having sensed the event, or, without the camera 2 panning and/or tilting, the main image 112 focuses the sensor 3, the user can easily monitor the event.

At the same time, in the control area 113, a window 114 indicating a corresponding region 115 of the main image 112 is moved. That is, when the main image 112 is moved by panning and/or tilting, the window 114 is moved within the control area 113 to indicate the corresponding region 115 of the main image 112.

Figure 11:
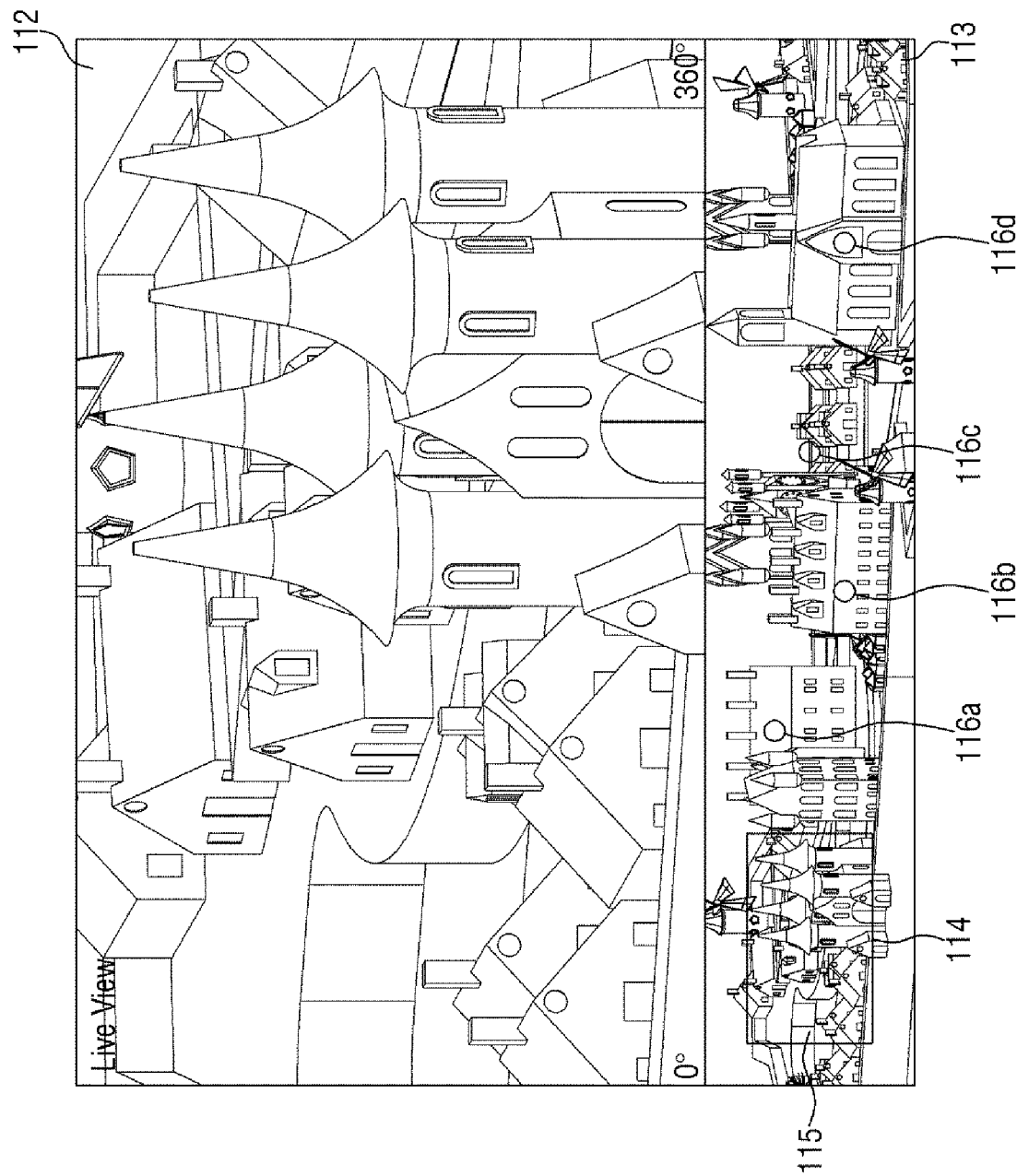
FIG. 11 is a view showing a plurality of pointers and a plurality of corresponding sensors, according to an exemplary embodiment.

FIG. 11 is a view showing a plurality of pointers 116 and a plurality of sensors 3 according to an exemplary embodiment.

A plurality of sensors 3 may be installed around the camera 2. In this example, in the control area 113 of the monitoring device 1, a plurality of pointers 116 are displayed each at a point corresponding to the location of each of the sensors 3.

Since the sensors 3 are associated with the respective pointers 116, the number of the sensors 3 is equal to the number of the pointers 116. Therefore, since four pointers 116a, 116b, 116c and 116d are shown in the control area 113 in FIG. 11, four sensors 3 are installed around the camera 2. It is, however, to be understood that the number of the sensors 3 and the number of the pointers 116 are not particularly limited herein.

Figure 12:
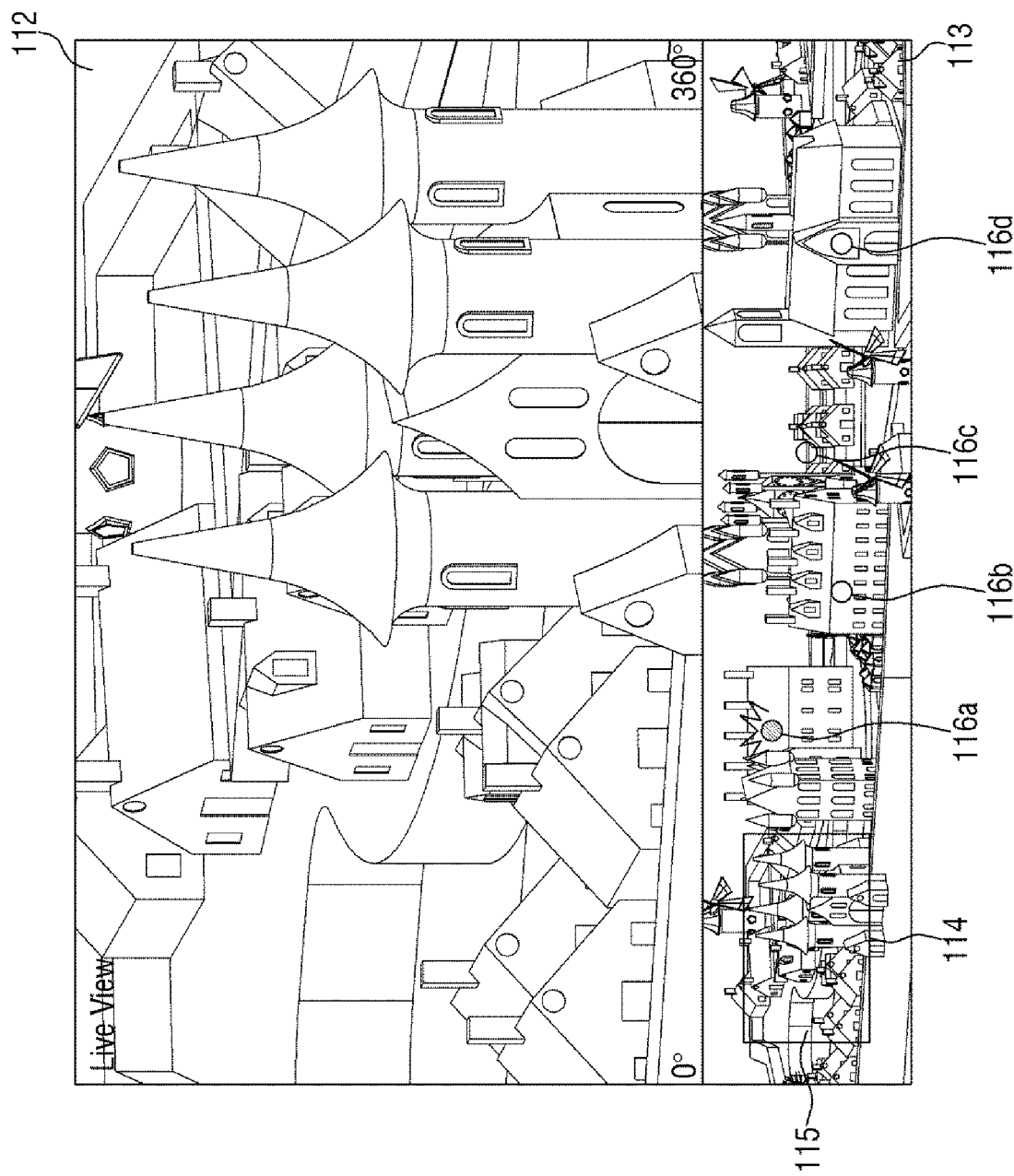
FIG. 12 is a view showing an example where an alarm sounds with indication of a pointer among a plurality of pointers, according to an exemplary embodiment.
Figure 13:
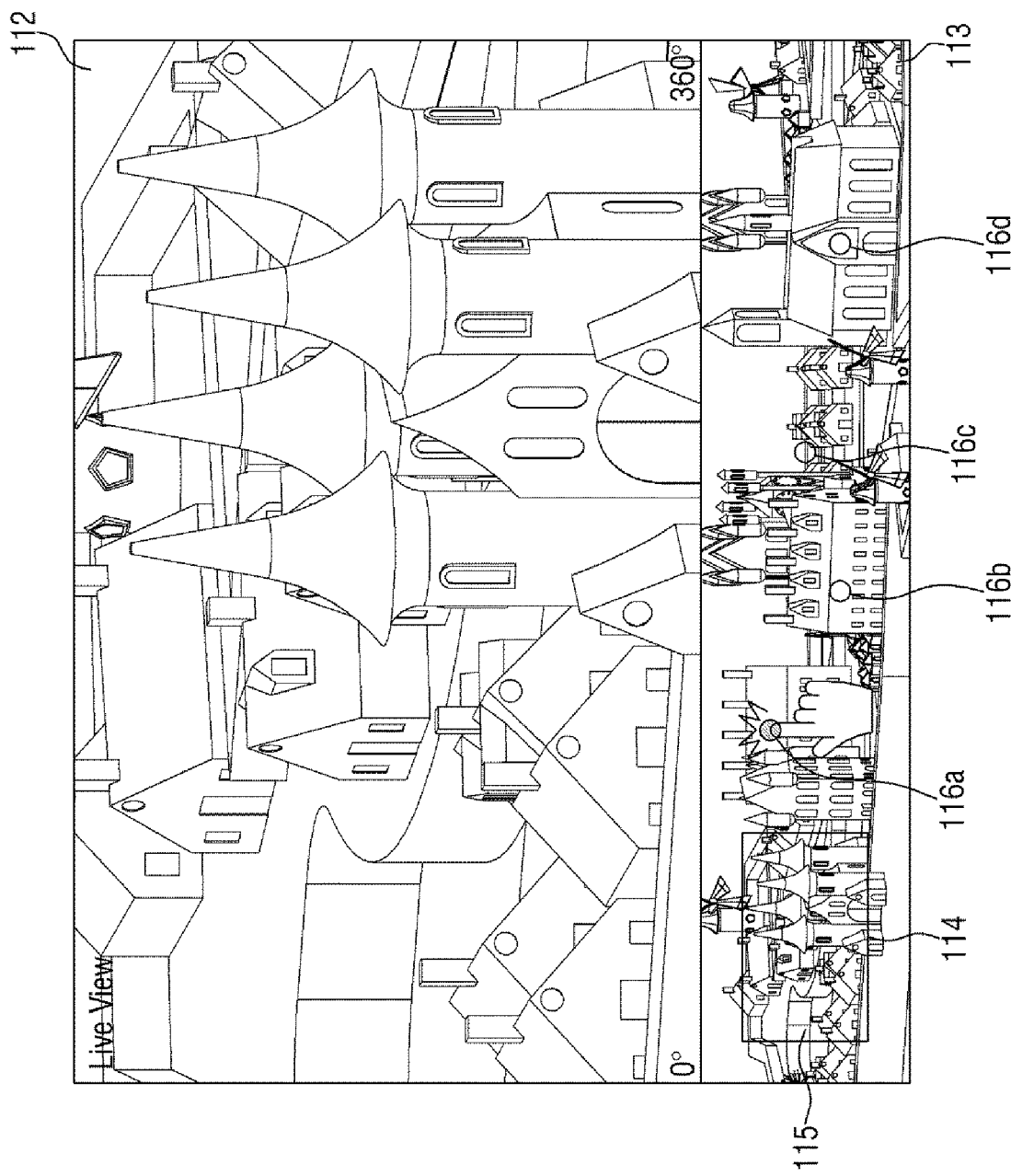
FIG. 13 is a view showing an example where a pointer is selected in a control area of a screen of a monitoring device, according to an exemplary embodiment.
Figure 14:
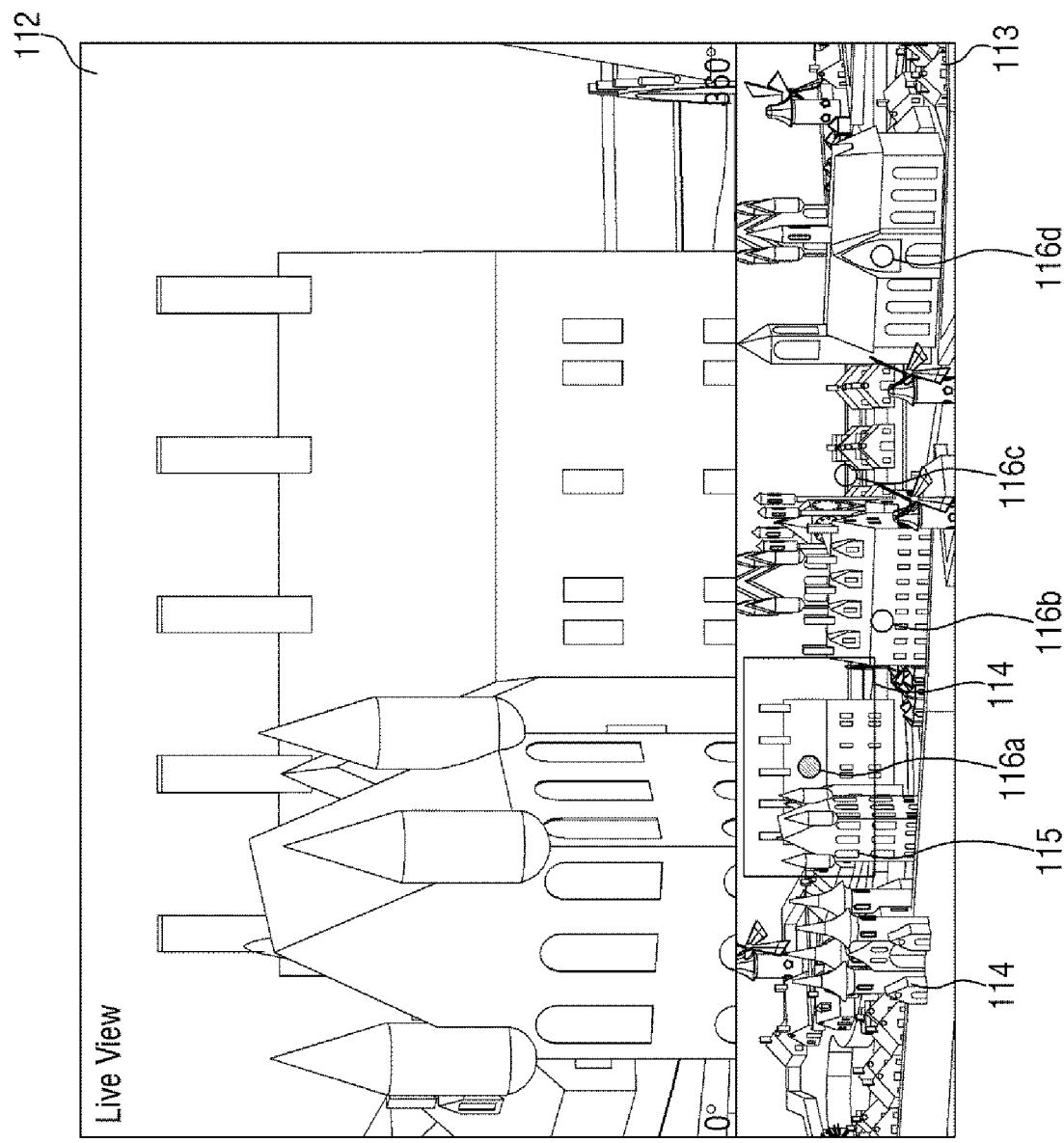
FIG. 14 is a view illustrating an example where an image focusing a sensor associated with a pointer in a control area of screen of a monitoring device is displayed, according to an exemplary embodiment.

FIG. 12 is a view showing an example where an alarm sounds with indication of a first pointer 116a as a source of an event sense signal among the plurality of pointers 116 of FIG. 11. FIG. 13 is a view showing an example where the first pointer 116a of FIG. 12 is selected. FIG. 14 is a view illustrating an example where an image focusing a first sensor associated with the first pointer 116a is displayed.

When the first sensor senses an event among the plurality of sensors 3, it sends an event sense signal to the monitoring device 1, and an alarm sounds with indication of the first pointer 116a associated with the first sensor in the control area 113 as the source of the event sense signal as shown in FIG. 12.

In this case, the camera 2 may automatically pan and/or tilt to move the main image 12, or, without the camera 2 panning and/or tilting, the main image 12 may be automatically panned and/or tilted to move, as described above with respect to FIGS. 9 and 10. According to another exemplary embodiment, the user may select the first pointer 116a by herself/himself as shown in FIG. 13. The foregoing panning and/or tilting may be carried out automatically or upon the user's selection, depending on the user's setting.

When the monitoring device 1 provides a touch screen feature, the user can select the pointer 116 by tapping it. When the user can input a command to the monitoring device 1 by using an input unit such as a mouse, the user may select the pointer 116 by clicking it. That is, the way that the user can select the pointer 116 is not particularly limited herein.

When an alarm sounds with respect to the first pointer 116a, the camera 2 pans and/or tilts automatically to move the main image 12, or, without the camera 2 panning and/or tilting, the main image 12 may be automatically panned and/or tilted, or the foregoing panning and/or tilting may be performed upon the user's selection, so that the main image 112 focuses the first sensor, as shown in FIG. 14.

At the same time, in the control area 113, a window 114 indicating a corresponding region 115 of the main image 112 is moved. That is, when the main image 112 is moved by panning and/or tilting, the window 114 is moved within the control area 113 to indicate the corresponding region 115 of the main image 112.

Figure 15:
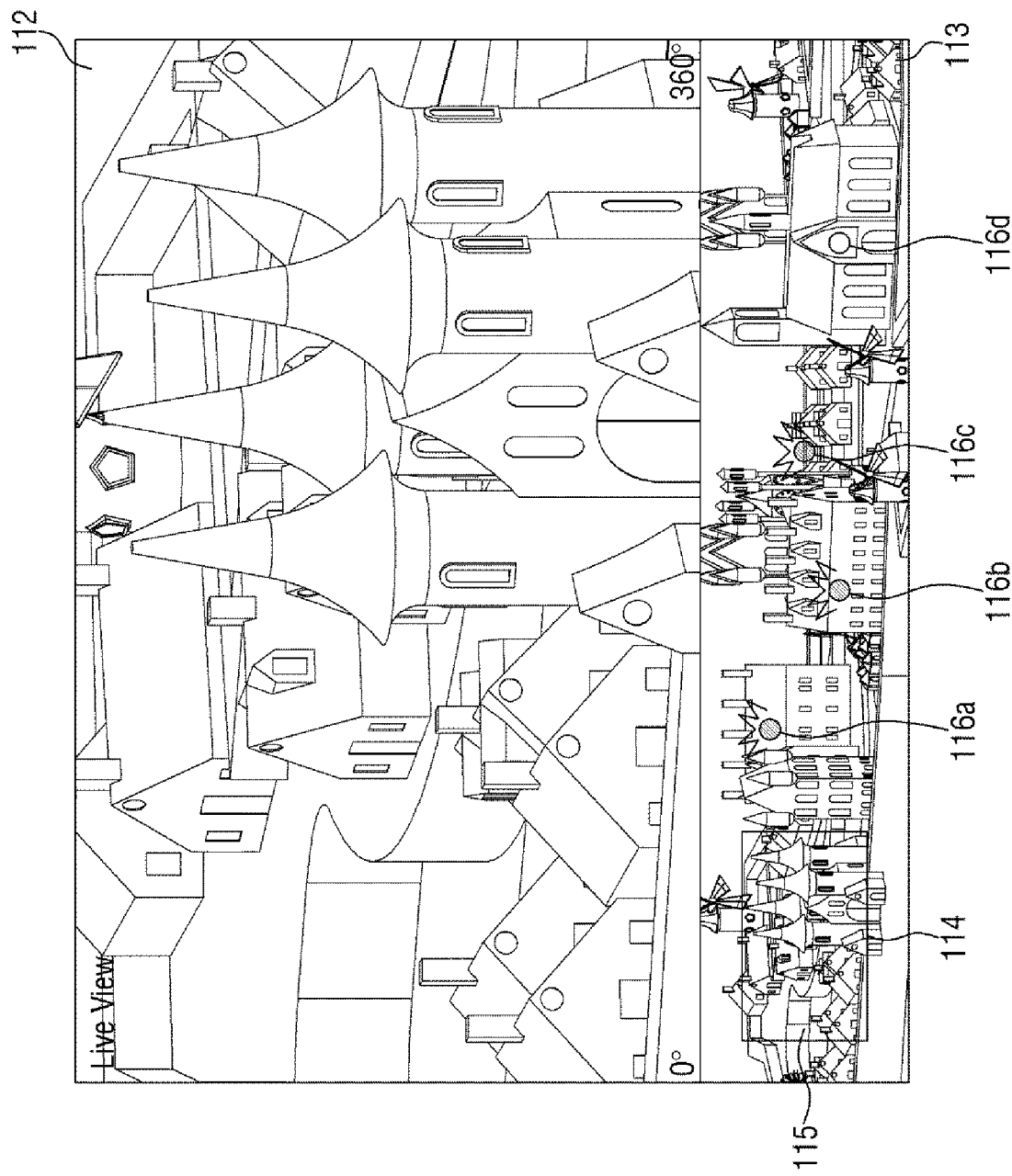
FIG. 15 is a view showing an example where alarms sound simultaneously with indication of a plurality of pointers in a control area of a screen of a monitoring device, according to an exemplary embodiment.

FIG. 15 is a view showing an example where alarms sound simultaneously with indication of the first to third pointers 116a, 116b and 116c among the plurality of pointers 116 of FIG. 11.

The sensors 3 are installed independently of one another. Accordingly, the sensors 3 may sense an event simultaneously. When the first to third sensors among the plurality of sensors 3 sense an event, each of them transmits an event sense signal to the monitoring device 1. Then, as shown in FIG. 12, alarms sound with indication of the first to third pointers 116a, 116b and 116c associated with to the first to third sensors, respectively, in the control area 113 as sources of event sense signals. A single event may occur such that the first to third sensors may sense the event simultaneously or different events may occur such that the first to third sensors may sense the events, respectively.

Figure 16:
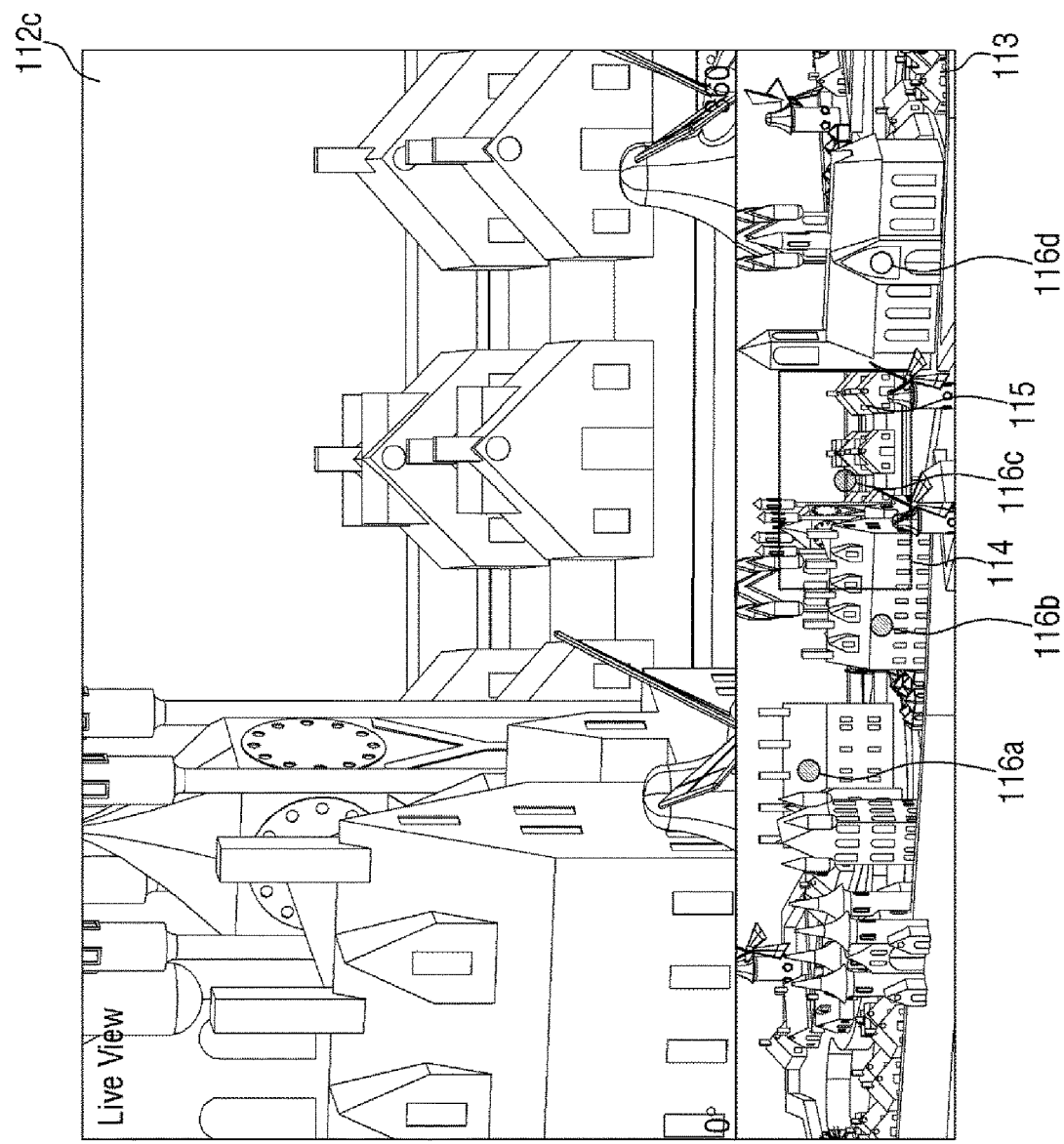
FIGS. 16 to 18 are views showing examples where a plurality of images focusing a plurality of sensors associated with a plurality of pointers, respectively, in a control area of a screen of a monitoring device are displayed sequentially, according to an exemplary embodiment.
Figure 17:
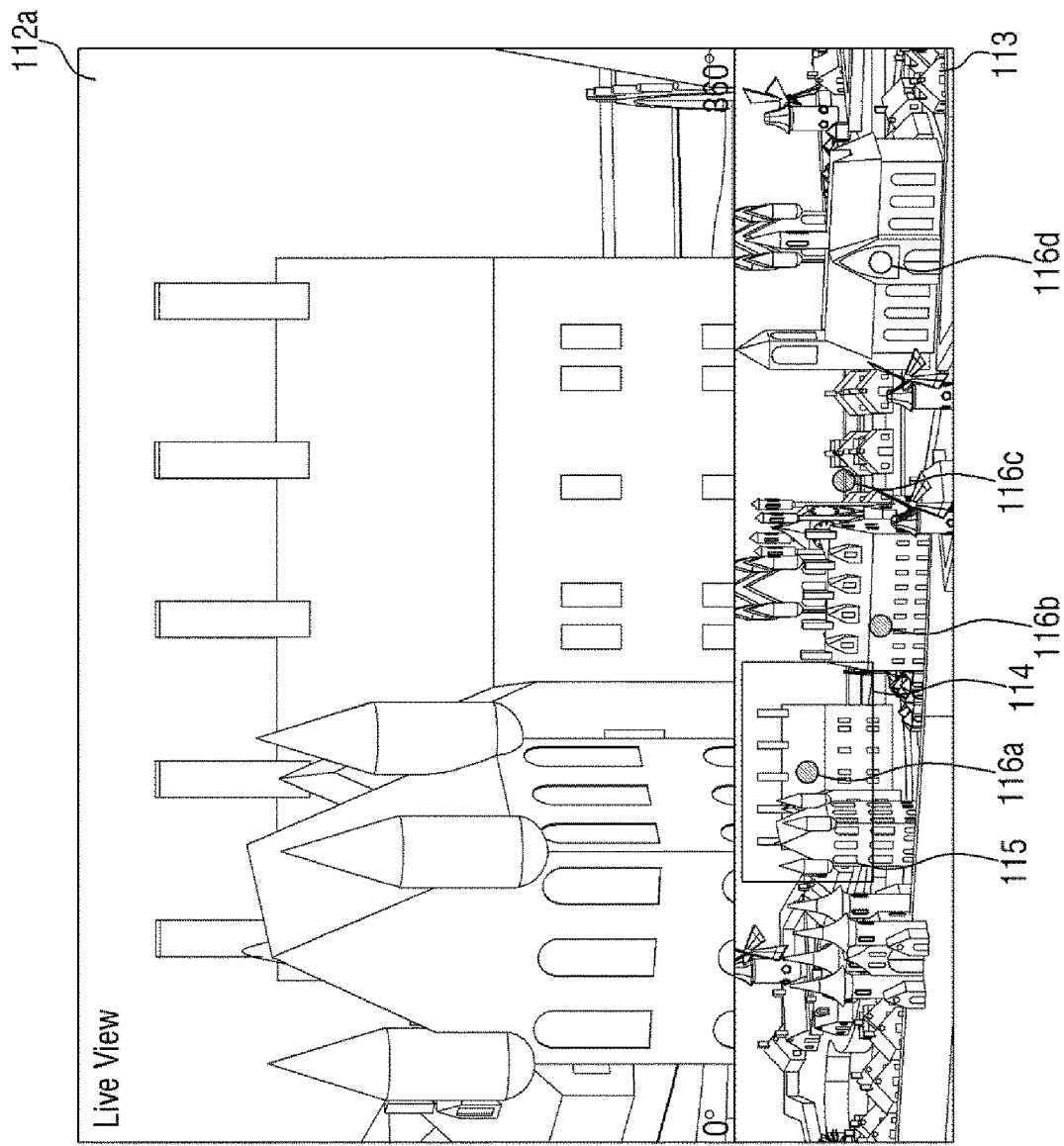
Figure 18:
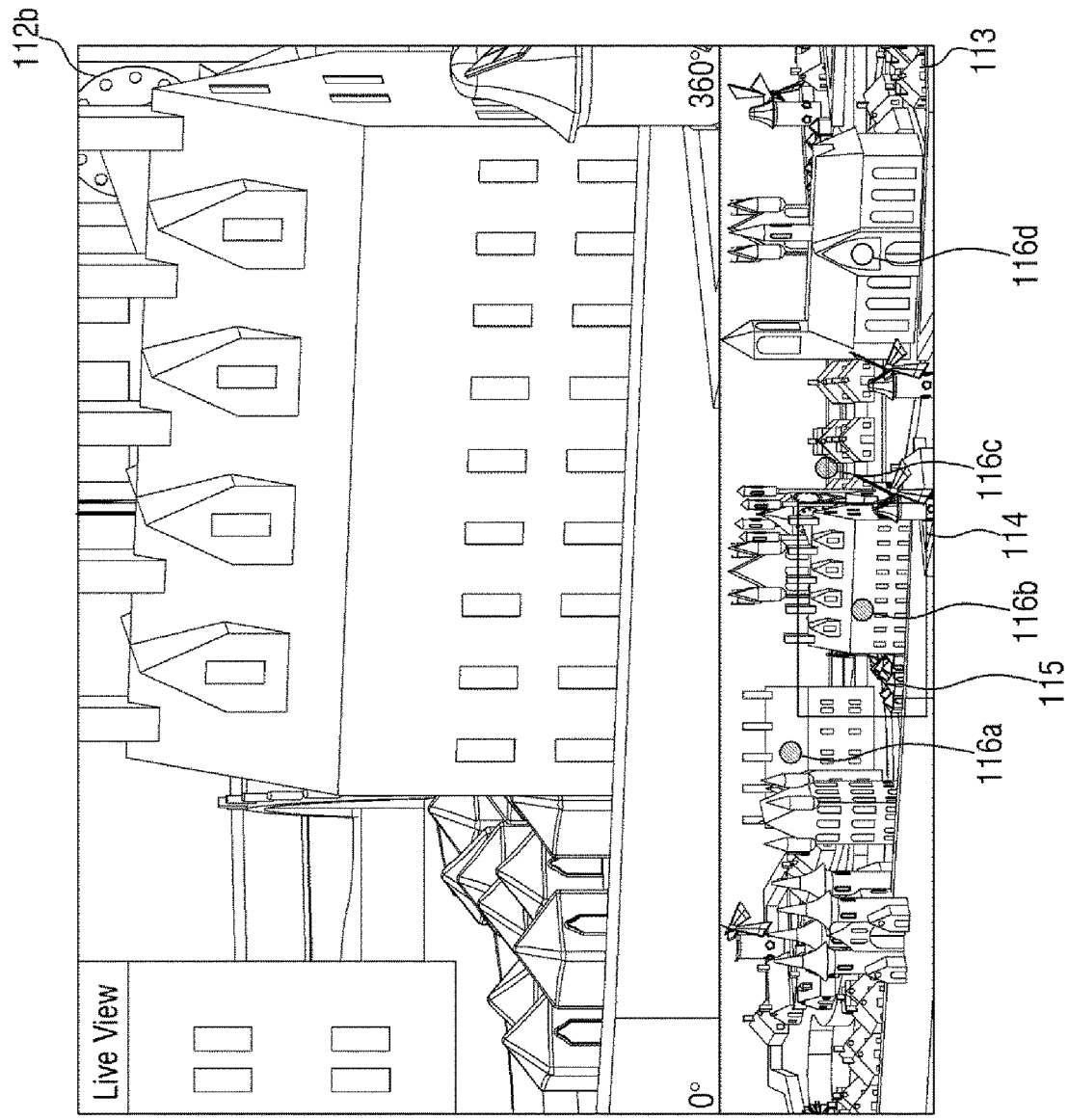

FIGS. 16 to 18 are views showing examples where first to third images 112a, 112b and 112c focusing the first to third sensors associated with the first to third pointers 116a, 116b and 116c of FIG. 15, respectively, are displayed sequentially.

A first image 112a focusing a position where the first sensor is installed, a second image 112b focusing a position where the second sensor is installed, and a third image 112c focusing a position where the third sensor is installed are different images. However, if alarms sound simultaneously with indication of the first to third pointers 116a, 116b and 116c in the control area 113, more than one main images have to be panned and/or tilted. Accordingly, it is necessary to display different first to third images 112a, 112b and 112c on the single screen 11.

If an image is panned and/or tilted by the user's selection, only an image associated with one of the pointers 116a, 116b and 116c selected by the user is displayed. In contrast, if an image is automatically panned and/or tilted, a so-called "sequence view" may be displayed in the order of the first to third images 112a, 112b, and 112c according to an exemplary embodiment. More specifically, when alarms sound with indication of the first to third pointers 116a, 116b and 116c in the control area 113, the first image 112a is initially displayed as the main image 112. After a while, the second image 112b is displayed as the main image 112, and then the third image 112c is displayed as the main image 112. That is, the first to third images 112a, 112b and 112c are sequentially switched at regular intervals and displayed as the main image 112. As described above, the camera 2 or the main image 12 may be panned and/or tilted automatically or upon the user's selection, depending on the user's setting.

The user may assign a priority to each of the plurality of sensors 3. For example, the user assigned a first priority to the third sensor, a second priority to the first sensor, a third priority to the fourth sensor, and a fourth priority to the second sensor. At this time, as shown in FIG. 15, when alarms sound with indication of the first to third pointers 116a, 116b and 116c in the control area 113, the first to third sensors have sensed an event. Initially, the third image 112c focusing the third sensor having the highest priority among the first to third sensors is displayed as the main image 112 as shown in FIG. 16. Then, after a while, the first image 112a focusing the first sensor having the second highest priority is displayed as the main image 112 as shown in FIG. 17. Then, after a while, the second image 112b focusing the second sensor having the third highest priority is displayed as the main image 112 as shown in FIG. 18. It is to be noted that although the fourth sensor has a higher priority than the second sensor, the fourth sensor senses no event, and thus, an image focusing the fourth sensor is not displayed.

Although not shown in the drawings, the user may assign importance to each of the plurality of sensors 3. For example, the user may assigned importance of level 2 to the first sensor, level 5 to the second sensor, level 4 to the third sensor, and level 3 to the fourth sensor. When alarms sound with indication of the first to third pointers 116a, 116b and 116c in the control area 113, the first to third sensors have sensed an event. Initially, the first image 112a is displayed as the main image 112. Since the first sensor has the level of 2, it is displayed for approximately two seconds, and then the second image 112b is displayed as the main image 112. Since the second sensor has the level of 5, it is displayed for approximately five seconds, and then the third image 112c is displayed as the main image 112. Since the third sensor has the level of 4, it is displayed for approximately four seconds, and then the first image 112a is displayed again, and so on. It is to be noted that although the fourth sensor is also assigned an importance, the fourth sensor senses no event and thus an image focusing the fourth sensor is not displayed.

That is, the user may assign either a priority or an importance level to each of the plurality of sensors 3. When the user assigns a priority to each of the plurality of sensors 3, each image focusing the positions where the respective sensors 3 are installed is displayed in the order of the priorities assigned by the user. If the user assigns an importance level to each of the plurality of sensors 3, the images are displayed for different durations depending on the importance level of each sensor 3 assigned by the user.

As described above, whenever the camera 2 pans and/or tilts to move the main image 112, or, without the camera 2 panning and/or tilting, the main image 112 is panned and/or moved, a window 114 indicating a corresponding region 115 of the main image 112 in the control area 113 is also moved.

Figure 19:
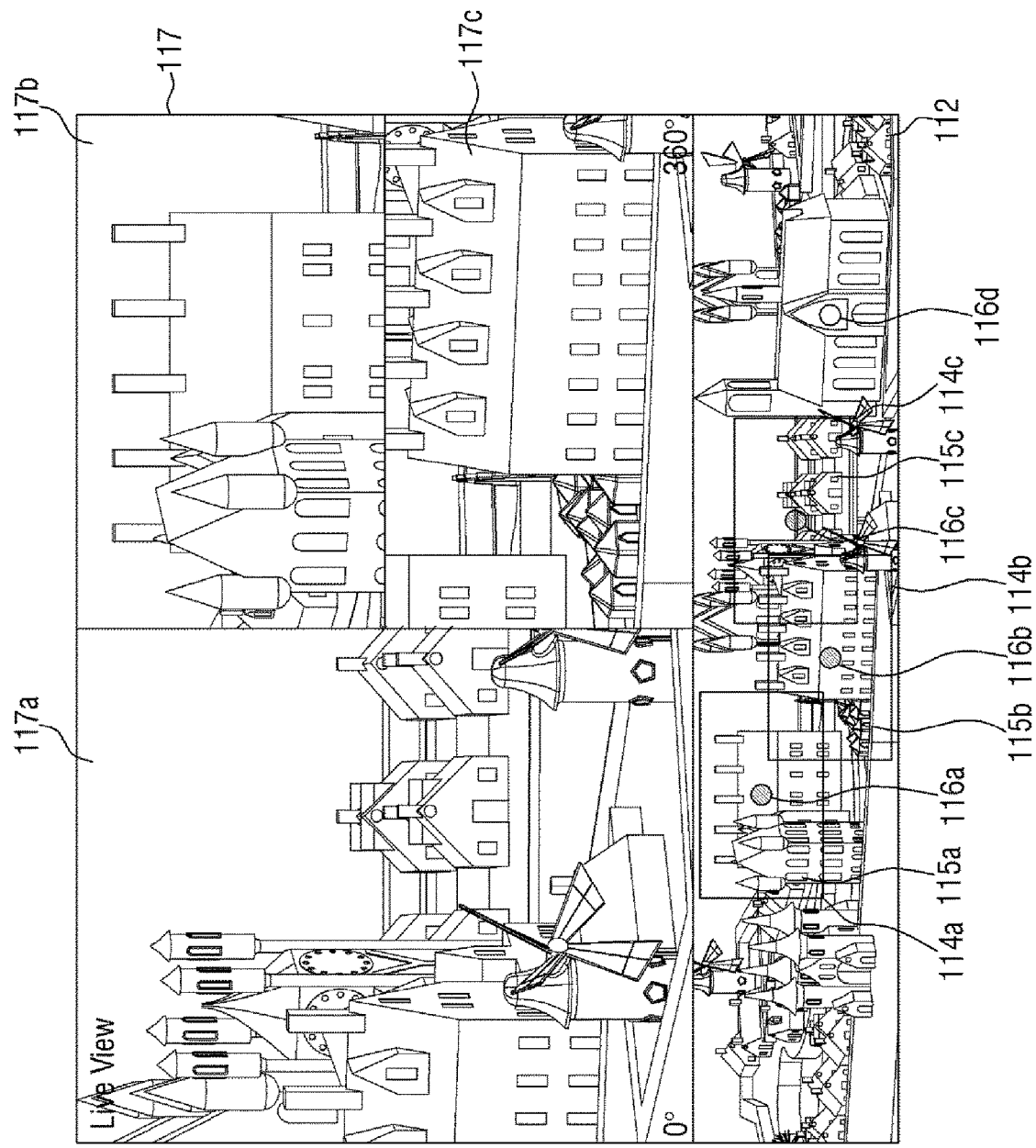
FIG. 19 is a view showing an example where a plurality of thumbnails are created such that images focusing locations where a plurality of sensors associated with a plurality of pointers, respectively, in a control area of a screen of a monitoring device are installed are displayed simultaneously, according to an exemplary embodiment.

FIG. 19 is a view showing an example where thumbnails 117a, 117b, and 117c are created such that images focusing the locations where the sensors 3 associated with the first to third pointers 116a, 116b, and 116c of FIG. 15, respectively, are installed are displayed simultaneously.

As described above, if the camera 2 is a 360° camera, the camera 2 has already acquired omnidirectional images. In addition, panning and/or tilting is carried out by the software installed in the monitoring device 1. Therefore, even when the sensors 3 have sensed an event simultaneously, it is not necessary to display a plurality of images sequentially, as described above with reference to FIGS. 16 to 18. That is, a plurality of images may be simultaneously displayed on the single screen 11.

More specifically, according to another exemplary embodiment, the camera 2 is a 360° camera and has already acquired omnidirectional images. At this time, when the sensors 3 have sensed an event simultaneously, the monitoring device 1 generates thumbnails 117a, 117b, and 117c respectively displaying divided images, whose number is equal to the number of the sensors 3 that have sensed the event. The monitoring device 1 displays a plurality of images focusing the sensors 3 that sensed the event, in the divided images, respectively.

For example, as shown in FIG. 15, when alarms sound with indication of the first to third pointers 116a, 116b and 116c in the control area 113, the first to third sensors have sensed an event. Then, three images are to be displayed, including the first to third images 112a, 112b and 112c. The monitoring device 1 automatically generates thumbnails 117a, 117b, and 117c displaying three divided images, as shown in FIG. 19. In the three divided images, the first to third images 112a, 112b and 112c are displayed, respectively. If four images are to be displayed, thumbnails of four divided images are generated. If six images are to be displayed, thumbnails of six divided images are generated.

As described above, the user may assign a priority to each of the plurality of sensors 3. For example, the user assigned the first priority to the third sensor, the second priority to the first sensor, the third priority to the fourth sensor, and the fourth priority to the second sensor. At this time, as shown in FIG. 15, when alarms sound with indication of the first to third pointers 116a, 116b and 116c in the control area 113 as sources of event sense signals, the first to third sensors have sensed an event. Initially, the third image 112c focusing the third sensor having the highest priority among the first to third sensors is displayed at the thumbnail 117a (a first divided image), which is the largest one among the thumbnails as shown in FIG. 19. Then, the first image 112a focusing the first sensor having the second highest priority is displayed at the thumbnail 117b (a second divided image), which is disposed between the second and third thumbnails 117b and 117c, as shown in FIG. 19. Then, the second image 112b focusing the second sensor having the third highest priority is displayed at the thumbnail 117c (a third divided image), which is disposed below the thumbnail 117b, as shown in FIG. 19. It is to be noted that although the fourth sensor has a higher priority than the second sensor, the fourth sensor senses no event, and thus, an image focusing the fourth sensor is not displayed.

As the thumbnails 117a, 117b, and 117c are created, the number of divided images is determined automatically based on the number of the images to be displayed. Further, the size and layout of the divided images are automatically determined depending on the number of divided images, as previously set. Once the priorities are assigned to the images, respectively, a divided image to be displayed for each of the images is determined. In the above example, the higher the priority of each of the images is, the larger the size of the divided images is displayed. If the sizes of the divided images are all equal, an image having a higher priority may be disposed at a predetermined position in the screen 11. It is, however, to be understood that the present disclosure is not limited thereto. The size and layout of the divided images may be determined differently as desired. Accordingly, the thumbnails 117a, 117b, and 117c may have different numbers, sizes and layouts of divided images. A plurality of images associated with the plurality of sensors 3 may be displayed in the various divided images.

Incidentally, as the thumbnails 117a, 117b, and 117c including a plurality of divided images are created in the main image 112, a plurality of images can be displayed simultaneously. At this time, a number of windows 114a, 114b and 114c indicating corresponding regions 115a, 115b and 115c of the plurality of images, respectively, are displayed in the control area 113.

The third image 112c displayed in the thumbnail 117a corresponds to a region 115c surrounded by a third window 114c in the control area 113. In addition, the first image 112a displayed in the thumbnail 117b corresponds to a region 115a surrounded by a first window 114a in the control area 113. In addition, the second image 112b displayed in the thumbnail 117c corresponds to a region 115a surrounded by a second window 114a in the control area 113. However, there are number of divided images and number of windows, and thus it is not easy for the user to match them.

Therefore, it is preferable, but not necessary, that the borders surrounding the divided images have the same colors as the windows surrounding the corresponding regions, respectively. Specifically, the border of the thumbnail 117a and the third window 114c may have the same color, the border of the thumbnail 117b and the first window 114a may have the same color, and the border of the thumbnail 117c and the second window 114b may have the same.

It will be evident to those skilled in the art that various modifications and changes may be made in the exemplary embodiments without departing from the technical idea or the gist of the inventive concept. Therefore, it should be understood that the above-mentioned embodiments are not limiting but illustrative in all aspects. It should be understood that the drawings and the detailed descriptions are not intended to limit the inventive concept to the particular forms disclosed herein, but on the contrary, the intention is to cover all modifications, equivalents, and alternatives falling within the spirit and scope of the inventive concept as defined by the appended claims.

What is claimed is:

1. A monitoring device comprising:
    a communication interface configured to receive image data acquired by a camera and a signal generated by at least one sensor;
    a screen configured to display, based on the received image data, a main image of an object in a first area of the screen; and
    a controller configured to control operations of the communication interface and the screen,
    wherein the controller controls the screen to include a control area around the first area, the control area displaying the main image and a surrounding image of the object in the main image, the surrounding image being an image acquired by panning and/or tilting the camera, and
    wherein the controller is further configured to, in response to the at least one sensor sensing at least one event:
        control generation of an alarm with indication of at least one pointer associated with the at least one sensor in the control area as a source of the sensing the at least one event, and
        control the main image in the first area to be changed to cover an area where the at least one sensor is disposed by panning and/or tilting the camera that acquires the image data, without a user input to specify an angle of the panning and/or tilting of the camera.

2. The monitoring device of claim 1, wherein, in response to the at least one sensor in the surrounding image sensing the at least one event, the controller controls the main image in the first area to be panned and/or tilted to cover the area where the at least one sensor is disposed.

3. The monitoring device of claim 1, wherein, in response to a user selecting the at least one pointer, associated with the at least one sensor sensing the at least one event, in the control area, the controller controls the screen to display the main image focusing the at least one sensor associated with the at least one pointer by panning and/or tilting the camera.

4. The monitoring device of claim 1, wherein, in response to a user selecting the at least one pointer, associated with the at least one sensor sensing the at least one event, in the control area, the controller controls the screen to display the main image focusing the at least one sensor associated with the at least one pointer by panning and/or tilting the main image without panning and/or tilting the camera.

5. The monitoring device of claim 1, wherein the surrounding image displayed in the control area comprises a panoramic image covering the main image.

6. The monitoring device of claim 5, wherein the main image and the surrounding image are captured by the camera comprising a fish-eye lens, and
wherein the panoramic image is a live view image in which the surrounding area is displayed in real time.

7. The monitoring device of claim 5, wherein the controller controls the control area to include a window indicating a region corresponding to the main image, and control the window to move within the control area in response to the main image being moved by or without panning and/or tilting the camera.

8. The monitoring device of claim 5, wherein the controller controls the control area to include a window indicating a region corresponding to the main image, and control the main image to move in response to the window being moved within the control area by or without panning and/or tilting the camera.

9. The monitoring device of claim 1, wherein the at least one sensor comprises a plurality of sensors, and the at least one pointer comprises a plurality of pointers associated with the plurality of sensors.

10. The monitoring device of claim 9, wherein, in response to the plurality of sensors simultaneously sensing the at least one event, the controller controls the screen to sequentially display a plurality of images covering the plurality of sensors, respectively.

11. The monitoring device of claim 10, wherein different priorities are assigned to the plurality of sensors, and
wherein the controller controls the screen to display the plurality of images in an order of priority.

12. The monitoring device of claim 10, wherein different importance levels are respectively assigned to the plurality of sensors, and
wherein the controller controls the screen to display the plurality of images in different time durations according to the different importance levels.

13. A monitoring system comprising:
the camera;
the at least one sensor; and
the monitoring device of claim 1.

14. A monitoring device comprising:
a communication interface configured to receive image data acquired by a camera and a signal generated by at least one sensor or a user;
a screen configured to display, based on the received image data, a main image of an object in a first area of the screen; and
a controller configured to control operations of the communication interface and the screen,
wherein the controller controls the screen to include a control area around the first area, the control area displaying the main image and a surrounding image of the object in the main image, the surrounding image being a live view of omnidirectional images acquired in real time by the camera that is a 360° camera, and
wherein the controller is further configured to, in response to the at least one sensor sensing at least one event:
control the screen to indicate at least one pointer associated with the at least one sensor in the control area as a source of the sensing the at least one event, and
control the main image in the first area to be changed to cover an area where the at least one sensor is disposed by panning and/or tilting the main image based on the omnidirectional images acquired in real time by the 360° camera.

15. The monitoring device of claim 14, wherein, in response to a user input on a point in the surrounding image, the controller controls the screen to move the main image to cover the point.

16. The monitoring device of claim 14, wherein, in response to a user input on a point in the surrounding image, the controller controls the camera to pan and/or tilt so that the main image covers the point.

17. The monitoring device of claim 14, wherein the at least one sensor comprises a plurality of sensors, and
in response to the plurality of sensors simultaneously sensing the at least one event, the controller controls the screen to simultaneously display thumbnails, which are generated by the 360° camera respectively focusing locations in which the plurality of sensors are located.

18. A monitoring method using a monitoring device, comprising:
receiving image data acquired by a camera and a signal generated by at least one sensor or a user;
displaying, based on the received image data, a main image of an object in a first area of a screen; and
controlling the screen to include a control area around the first area, the control area displaying the main image and a surrounding image of the object in the main image, the surrounding image being an image acquired by panning and/or tilting the camera, and
wherein, in response to the at least one sensor sensing at least one event, controlling the screen to indicate at least one pointer associated with the at least one sensor in the control area as a source of the sensing the at least one event, and controlling the main image in the first area to be changed to cover an area where the at least one sensor is disposed by panning and/or tilting the camera that acquires the image data, without a user input to specify an angle of the panning and/or tilting of the camera.

19. The monitoring method of claim 18, wherein, in response to a user input on a point in the surrounding image, controlling the screen to move the main image to cover the point.

20. The monitoring method of claim 18, wherein, in response to a user input on a point in the surrounding image, controlling the camera to pan and/or tilt so that the main image covers the point.

* * * * *